US012771104B2

(12) United States Patent
Nakashima et al.

(10) Patent No.: US 12,771,104 B2
(45) Date of Patent: Oct. 20, 2026

(54) WIRE HARNESS PROTECTION MEMBER AND METHOD OF MANUFACTURING PROTECTION MEMBER-EQUIPPED WIRE HARNESS

(71) Applicant: YAZAKI CORPORATION, Tokyo (JP)

(72) Inventors: Akinori Nakashima, Makinohara (JP); Keishi Natsume, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 199 days.

(21) Appl. No.: 18/961,394

(22) Filed: Nov. 26, 2024

(65) Prior Publication Data

US 2025/0183634 A1 Jun. 5, 2025

(30) Foreign Application Priority Data

Dec. 5, 2023 (JP) ................................ 2023-205588

(51) Int. Cl.
*H02G 3/04* (2006.01)

(52) U.S. Cl.
CPC ................................ *H02G 3/0406* (2013.01)

(58) Field of Classification Search
CPC ...... H02G 3/0406; H02G 3/0481; H02G 1/00; H02G 3/0462; H01B 13/012
See application file for complete search history.

(56) References Cited

U.S. PATENT DOCUMENTS 4,737,526 A * 4/1988 Mukaiyama ............ C08J 9/141 521/149
6,068,935 A * 5/2000 Hayami ................ B29C 61/003 528/308
6,319,961 B1 * 11/2001 Takahashi ................ C08J 9/00 521/142
8,063,308 B2 * 11/2011 Morioka ................ C08K 3/22 174/110 SR
9,947,439 B2 * 4/2018 Inao .................... H01B 7/0045
10,407,807 B2 * 9/2019 Fukuyama .......... H02G 3/0481
2003/0217864 A1 * 11/2003 Ishikawa ............. H01B 7/0045 174/135

(Continued)

FOREIGN PATENT DOCUMENTS

JP 2011078231 A 4/2011
JP 2014017243 A 1/2014
WO 2012/008364 A1 1/2012

*Primary Examiner* — Medhat Badawi
(74) *Attorney, Agent, or Firm* — KENEALY VAIDYA LLP

(57) ABSTRACT

A wire harness protection member has: a protector constituted by overlapping a plurality of sheet materials; and a fixing portion which fixes both end portions of the protector to each other, in which the plurality of sheet materials has same materials and same shapes, the plurality of sheet materials includes a first sheet material and a second sheet material, the second sheet material is disposed at a position shifted from the first sheet material in an axial direction of the wire harness, the protector is wound around the wire harness such that the inner side surfaces of both end portions of the protector face each other, and the fixing portion fixes both end portions of the protector to each other along an opposing direction in which the inner side surfaces of both end portions of the protector face each other.

5 Claims, 21 Drawing Sheets

(56) References Cited

U.S. PATENT DOCUMENTS

| | | | | |
|---|---|---|---|---|
| 2009/0281228 | A1* | 11/2009 | Kamata | C09D 11/30 524/503 |
| 2010/0294533 | A1* | 11/2010 | Yagi | H01B 7/361 116/201 |
| 2010/0328908 | A1* | 12/2010 | Nakashima | H01R 13/68 361/752 |
| 2011/0178506 | A1* | 7/2011 | Numata | A61M 25/002 604/528 |
| 2011/0275268 | A1* | 11/2011 | Harris | B60R 16/0215 156/190 |
| 2013/0098660 | A1* | 4/2013 | Igarashi | H02G 3/0481 156/60 |
| 2013/0118799 | A1* | 5/2013 | Watanabe | H02G 3/0481 174/72 A |
| 2015/0179311 | A1* | 6/2015 | Tohyama | H01B 11/1869 29/868 |
| 2016/0315459 | A1* | 10/2016 | Nakashima | H05K 5/0247 |
| 2018/0162297 | A1* | 6/2018 | Adachi | H02G 3/0481 |
| 2018/0331521 | A1* | 11/2018 | Ishida | H01B 7/02 |
| 2019/0123532 | A1* | 4/2019 | Ito | H02G 3/0481 |
| 2019/0344733 | A1* | 11/2019 | Toyoshima | H02G 3/0406 |
| 2020/0321757 | A1* | 10/2020 | Kawamura | H02G 3/0468 |
| 2022/0024394 | A1* | 1/2022 | Hagi | H02G 3/0406 |
| 2022/0407296 | A1* | 12/2022 | Mizushita | B60R 16/0215 |
| 2023/0069530 | A1* | 3/2023 | Nakashima | B60R 16/0238 |
| 2023/0076202 | A1* | 3/2023 | Hayashi | H01B 7/00 |
| 2023/0088375 | A1* | 3/2023 | Hayashi | H01B 7/18 174/72 A |
| 2023/0102530 | A1* | 3/2023 | Saito | B60R 16/0215 174/72 A |
| 2023/0102856 | A1* | 3/2023 | Nakashima | H02G 3/083 174/50 |
| 2024/0381578 | A1* | 11/2024 | Kiyosue | H05K 7/20409 |
| 2025/0140440 | A1* | 5/2025 | Uno | B60R 16/0215 |
| 2025/0183634 | A1* | 6/2025 | Nakashima | H02G 3/0406 |
| 2025/0183638 | A1* | 6/2025 | Nakashima | H01B 7/1875 |
| 2025/0206243 | A1* | 6/2025 | Oka | B60R 16/0215 |
| 2025/0206381 | A1* | 6/2025 | Oka | H02G 3/386 |
| 2025/0206394 | A1* | 6/2025 | Oka | H02G 1/085 |
| 2025/0210219 | A1* | 6/2025 | Oka | B60R 16/0207 |
| 2025/0263030 | A1* | 8/2025 | Kiyosue | B60R 16/0215 |
| 2025/0266186 | A1* | 8/2025 | Kiyosue | B60R 16/0215 |

* cited by examiner

WIRE HARNESS PROTECTION MEMBER AND METHOD OF MANUFACTURING PROTECTION MEMBER-EQUIPPED WIRE HARNESS

CROSS-REFERENCE TO RELATED APPLICATION(S)

The present application claims priority to and incorporates by reference the entire contents of Japanese Patent Application No. 2023-205588 filed in Japan on Dec. 5, 2023.

BACKGROUND OF THE INVENTION

1. Field of the Invention

The present invention relates to a wire harness protection member and a method of manufacturing a protection member-equipped wire harness.

2. Description of the Related Art

Conventionally, there is a structure that protects a wire harness. International Publication No. 2012/008364 discloses a wire harness protection structure including: a protection member that covers an outer circumference of a wire harness at a predetermined location; and a fixing adhesive tape having a starting end portion that is wound around and fixed to the wire harness and a terminal end portion that is wound around an outer circumference of the protection member to fix the protection member, the terminal end portion being wound around and fixed to the wire harness on a side opposite to the starting end portion with the protection member interposed therebetween.

In the wire harness protection member, if a dedicated protection member is manufactured according to the required protection performance, then this results in an increase in the number of types of members. It is desirable to enable to manufacture a protection member according to the required protection performance while suppressing an increase in the number of types of members.

SUMMARY OF THE INVENTION

One object of the present invention is to provide a wire harness protection member capable of realizing the required protection performance while suppressing an increase in the number of types of members.

It is desirable to enable to efficiently perform a step of attaching the protection member to the wire harness. Another object of the present invention is to provide a method of manufacturing a protection member-equipped wire harness, which can efficiently perform the step of attaching the protection member to the wire harness.

In order to achieve the above mentioned object, a wire harness protection member according to one aspect of the present invention includes a protector constituted by overlapping a plurality of sheet materials; and a fixing portion which fixes both end portions of the protector to each other in a state where the protector is wound around a wire harness, wherein the plurality of sheet materials has same materials and same shapes, the plurality of sheet materials includes a first sheet material and a second sheet material, the second sheet material is disposed at a position shifted from the first sheet material in an axial direction of the wire harness, and partially overlaps the first sheet material, the protector has an inner side surface facing the wire harness in a state of being wound around the wire harness, the protector is wound around the wire harness such that the inner side surfaces of both end portions of the protector face each other to form mating surfaces extending in the axial direction, and the fixing portion fixes both end portions of the protector to each other along an opposing direction in which the inner side surfaces of both end portions of the protector face each other.

In order to achieve the above mentioned object, a method of manufacturing a protection member-equipped wire harness according to another aspect of the present invention includes a step of placing a protector constituted by overlapping a plurality of sheet materials in a groove portion of a jig; a step of accommodating a wire harness in the protector placed in the groove portion; and a step of fixing both end portions of the protector to each other by a fixing portion to attach the protector to the wire harness.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A wire harness protection member and a method of manufacturing a protection member-equipped wire harness according to embodiments of the present invention will be described in detail below with reference to the drawings. Note that the present invention is not limited by the embodiments. Further, the components in the following embodiments include those which can be easily assumed by those skilled in the art or those which are substantially the same.

Embodiment

Figure 1:
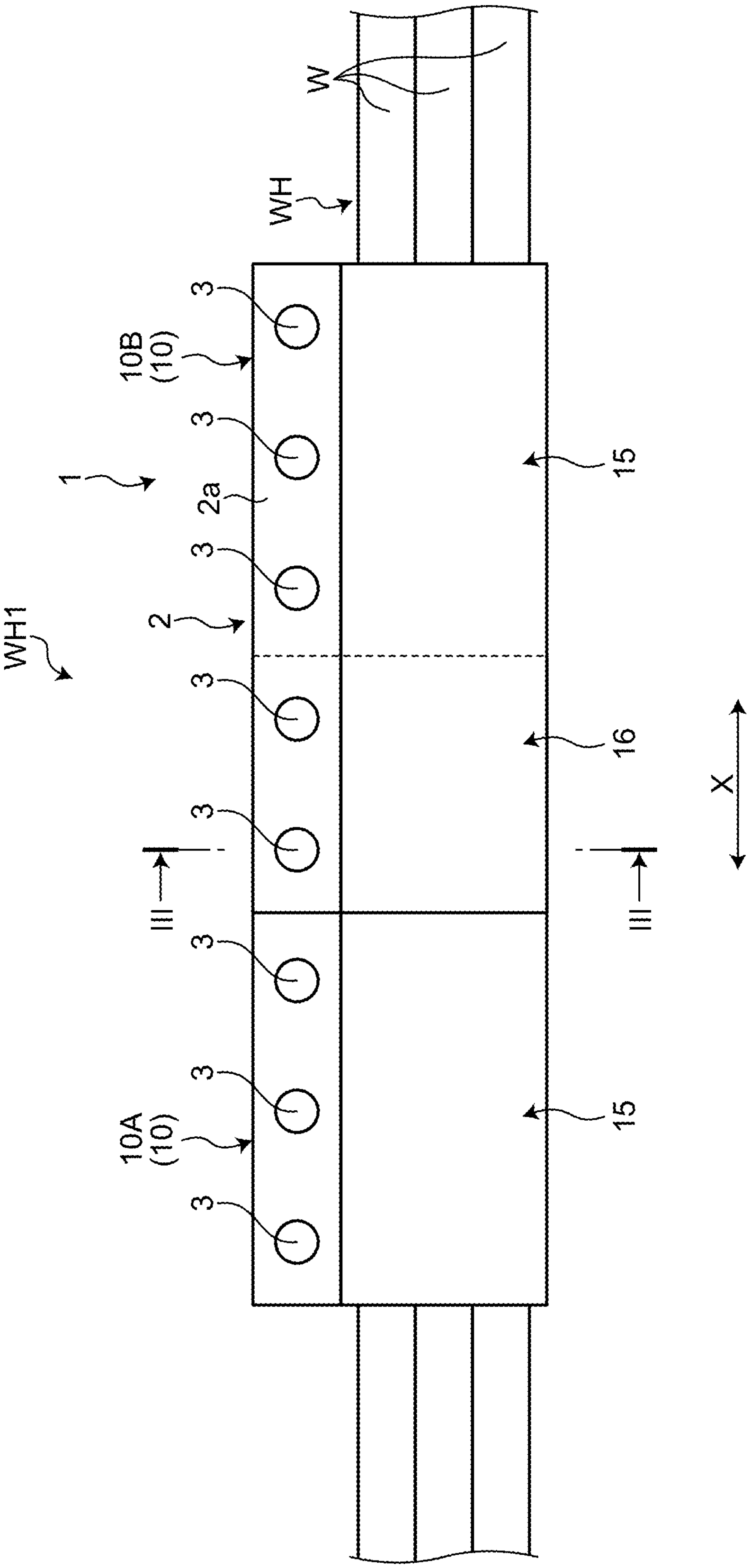
FIG. 1 is a front view of a protection member-equipped wire harness according to an embodiment.
Figure 3:
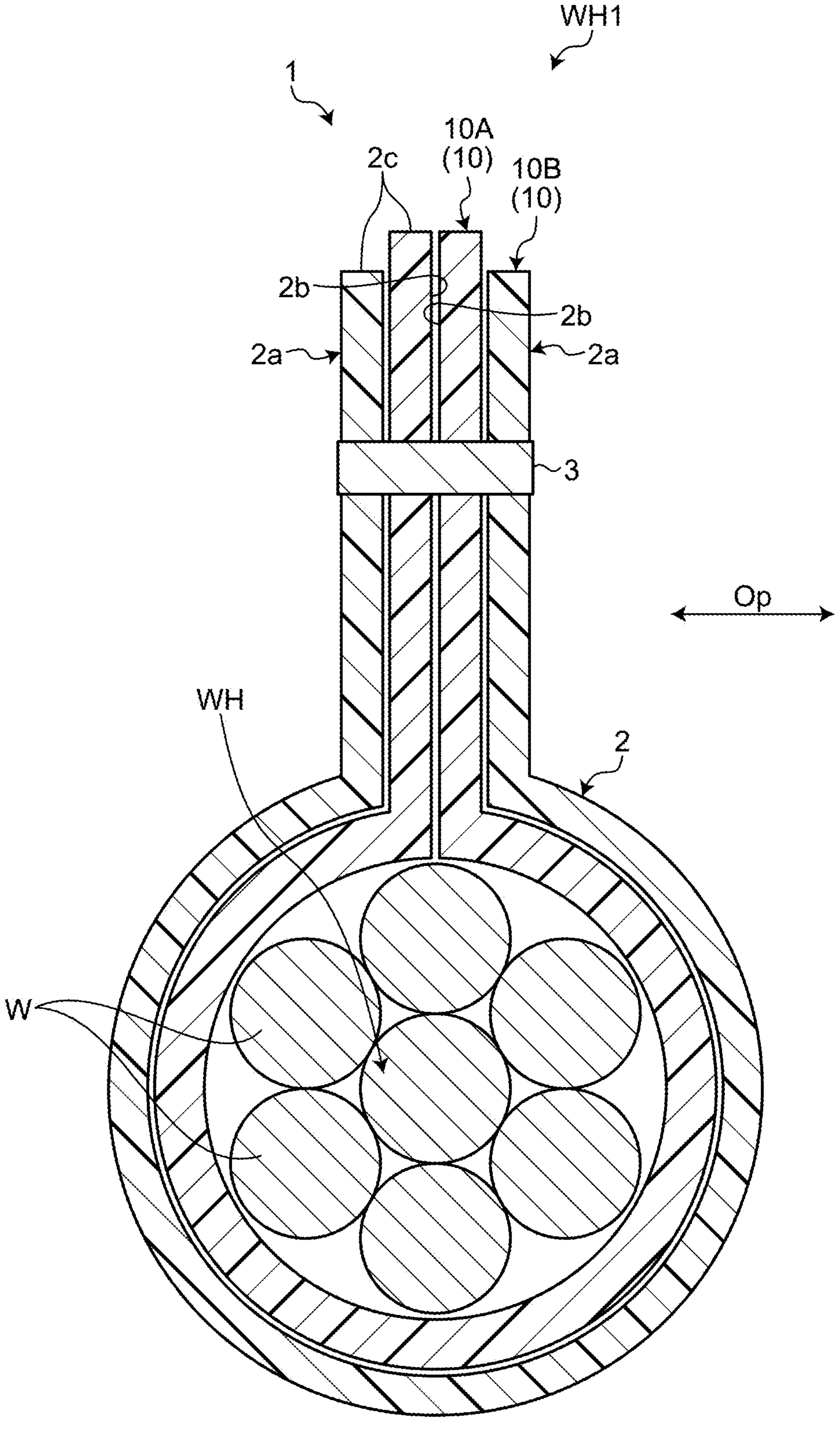
FIG. 3 is a cross-sectional view of the protection member-equipped wire harness according to the embodiment.
Figure 4:
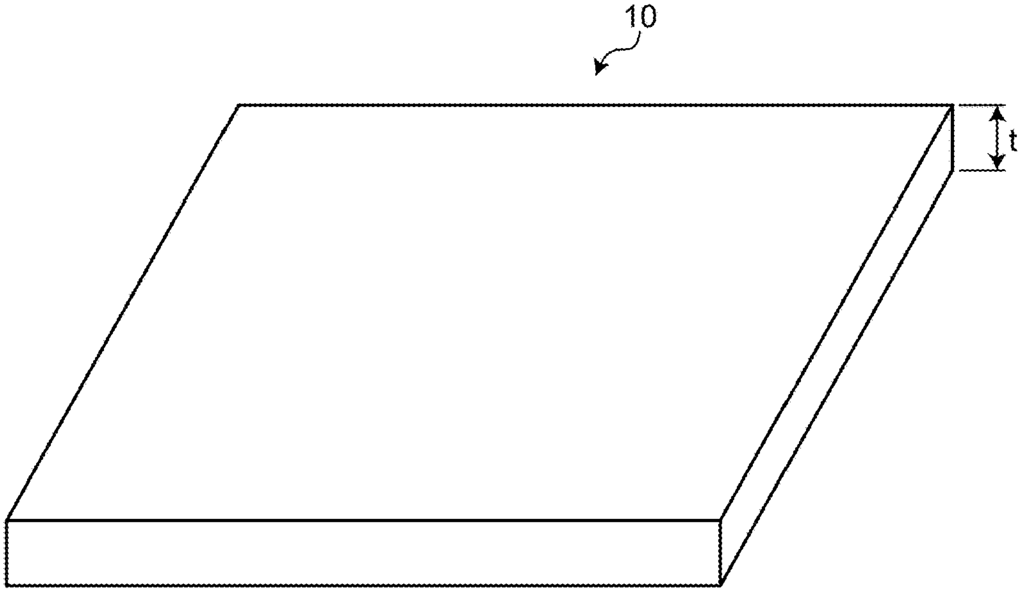
FIG. 4 is a perspective view of a sheet material according to the embodiment.
Figure 5:
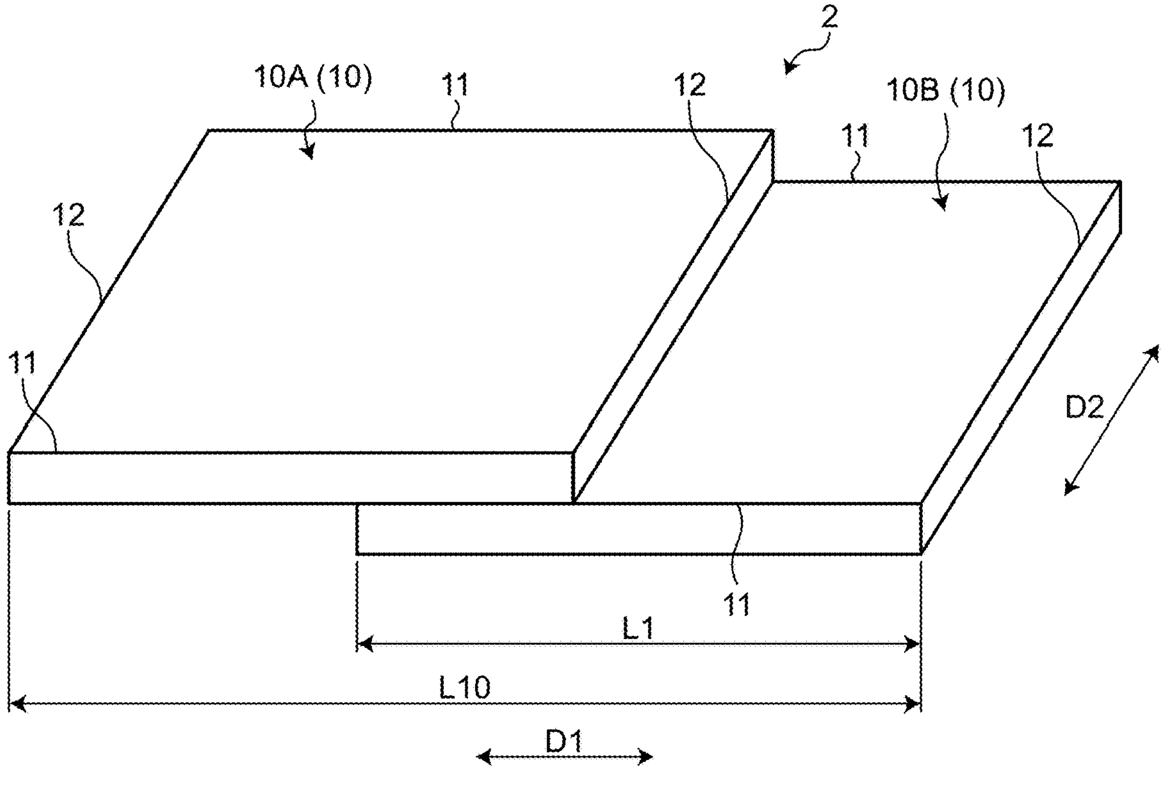
FIG. 5 is a perspective view of a protector according to the embodiment.
Figure 6:
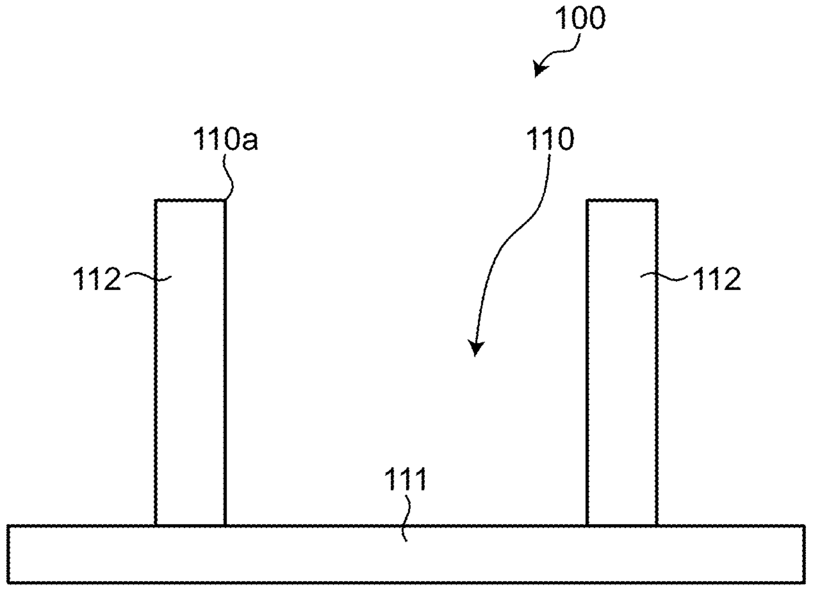
FIG. 6 is a side view of a jig according to the embodiment.
Figure 7:
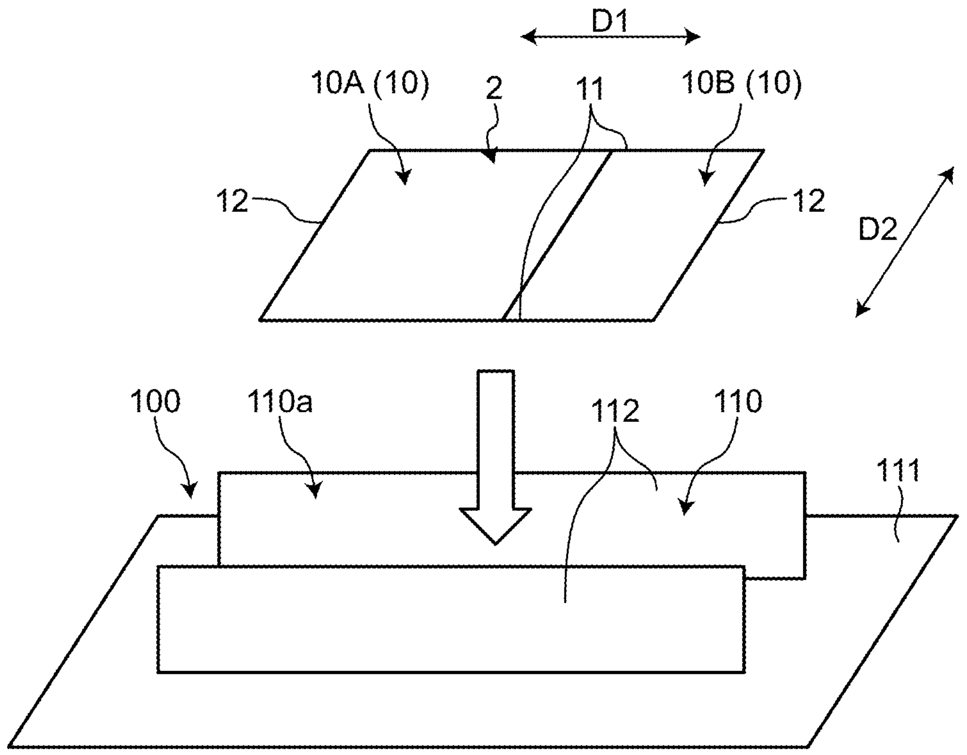
FIG. 7 is a perspective view illustrating the protector to be placed in a groove portion of the jig.
Figure 8:
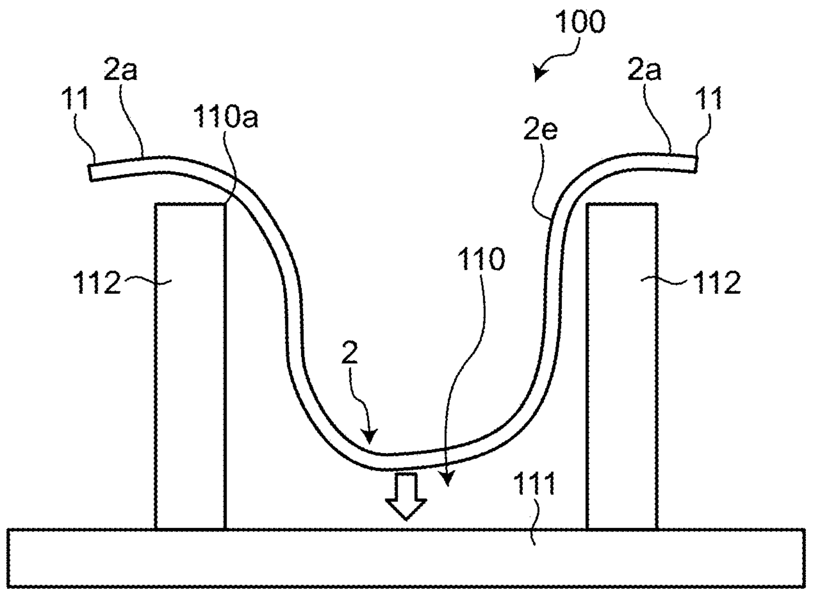
FIG. 8 is a side view illustrating the protector placed in the groove portion of the jig.
Figure 9:
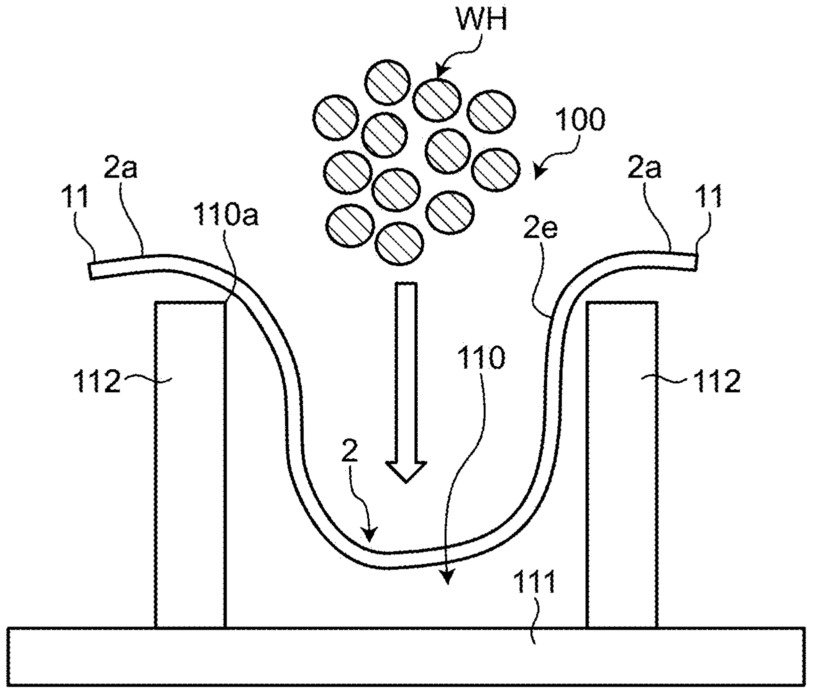
FIG. 9 is a side view illustrating the wire harness to be accommodated in the protector.
Figure 10:
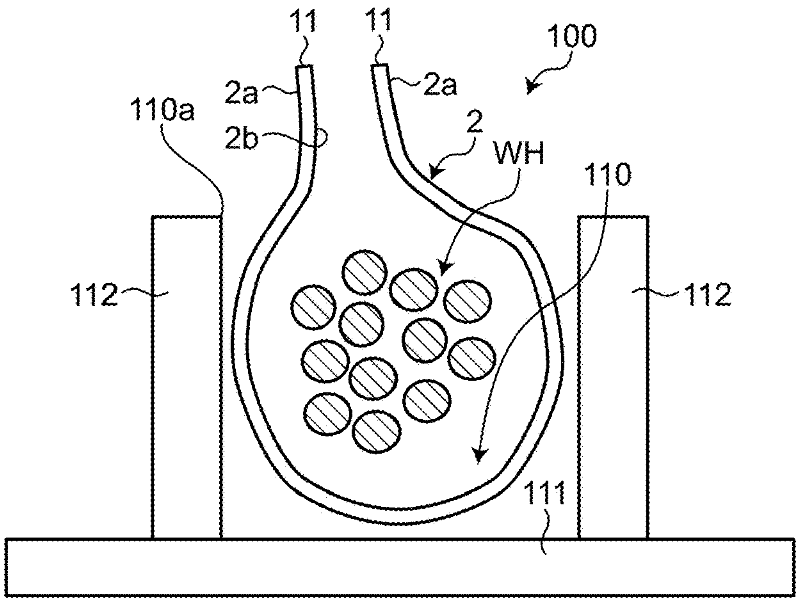
FIG. 10 is a side view illustrating the wire harness accommodated in the protector.

An embodiment will be described with reference to FIGS. 1 to 28. The present embodiment relates to a wire harness protection member and a method of manufacturing a protection member-equipped wire harness. FIG. 1 is a front view of a protection member-equipped wire harness according to an embodiment, FIG. 2 is a perspective view of the protection member-equipped wire harness according to the embodiment, FIG. 3 is a cross-sectional view of the protection member-equipped wire harness according to the embodiment, FIG. 4 is a perspective view of a sheet material according to the embodiment, FIG. 5 is a perspective view of a protector according to the embodiment, FIG. 6 is a side view of a jig according to the embodiment, FIG. 7 is a perspective view illustrating the protector to be placed in a groove portion of the jig, FIG. 8 is a side view illustrating the protector placed in the groove portion of the jig, FIG. 9 is a side view illustrating the wire harness to be accommodated in the protector, and FIG. 10 is a side view illustrating the wire harness accommodated in the protector.

Figure 11:
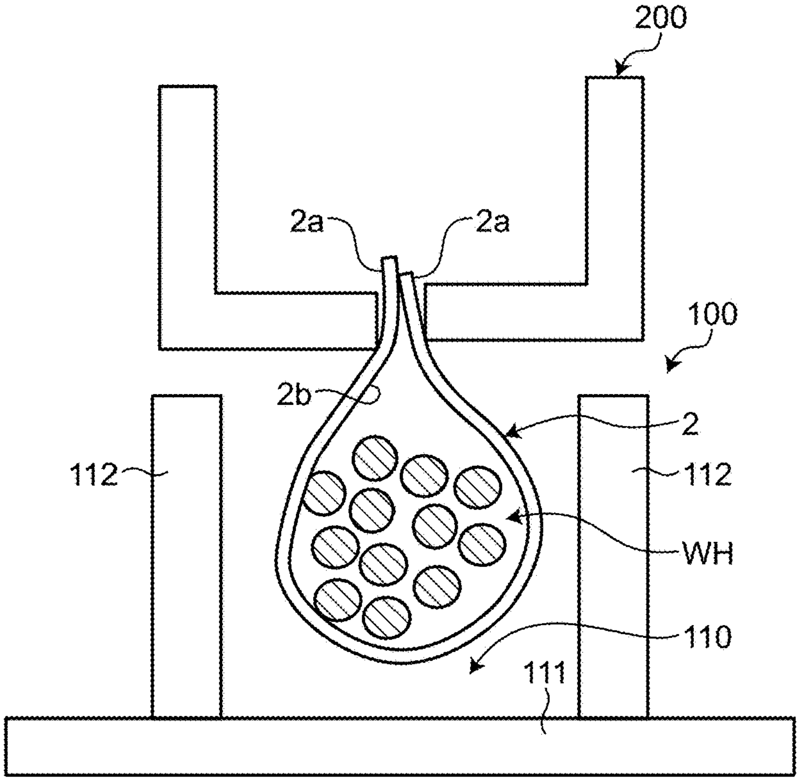
FIG. 11 is a diagram for explaining a welding machine for forming a fixing portion.
Figure 12:
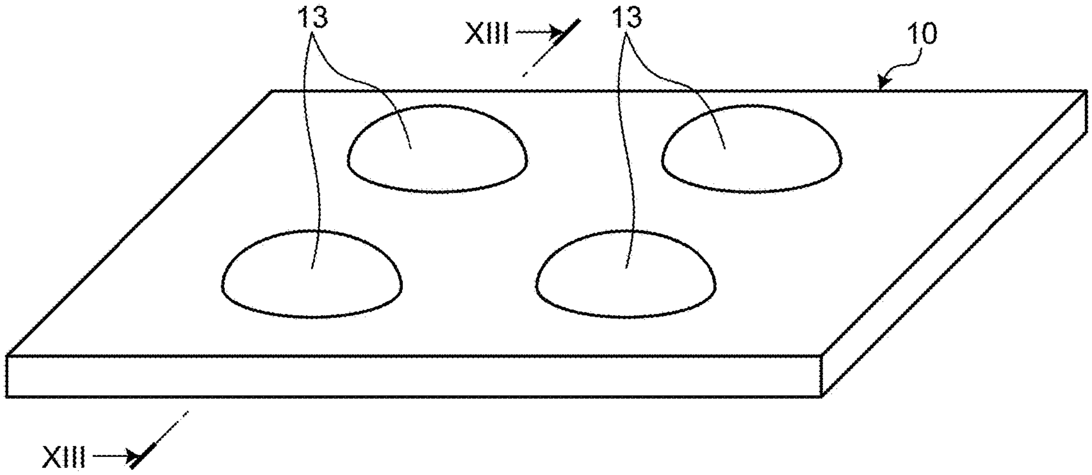
FIG. 12 is a perspective view of a sheet material according to the embodiment.
Figure 13:
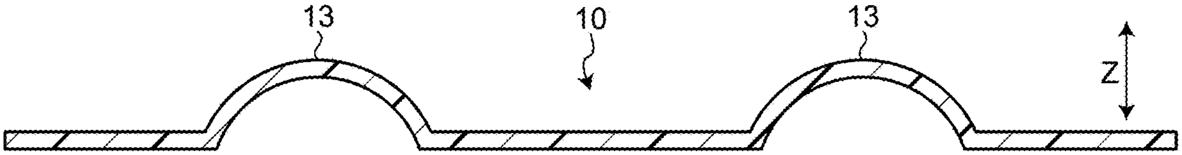
FIG. 13 is a cross-sectional view of the sheet material according to the embodiment.
Figure 14:
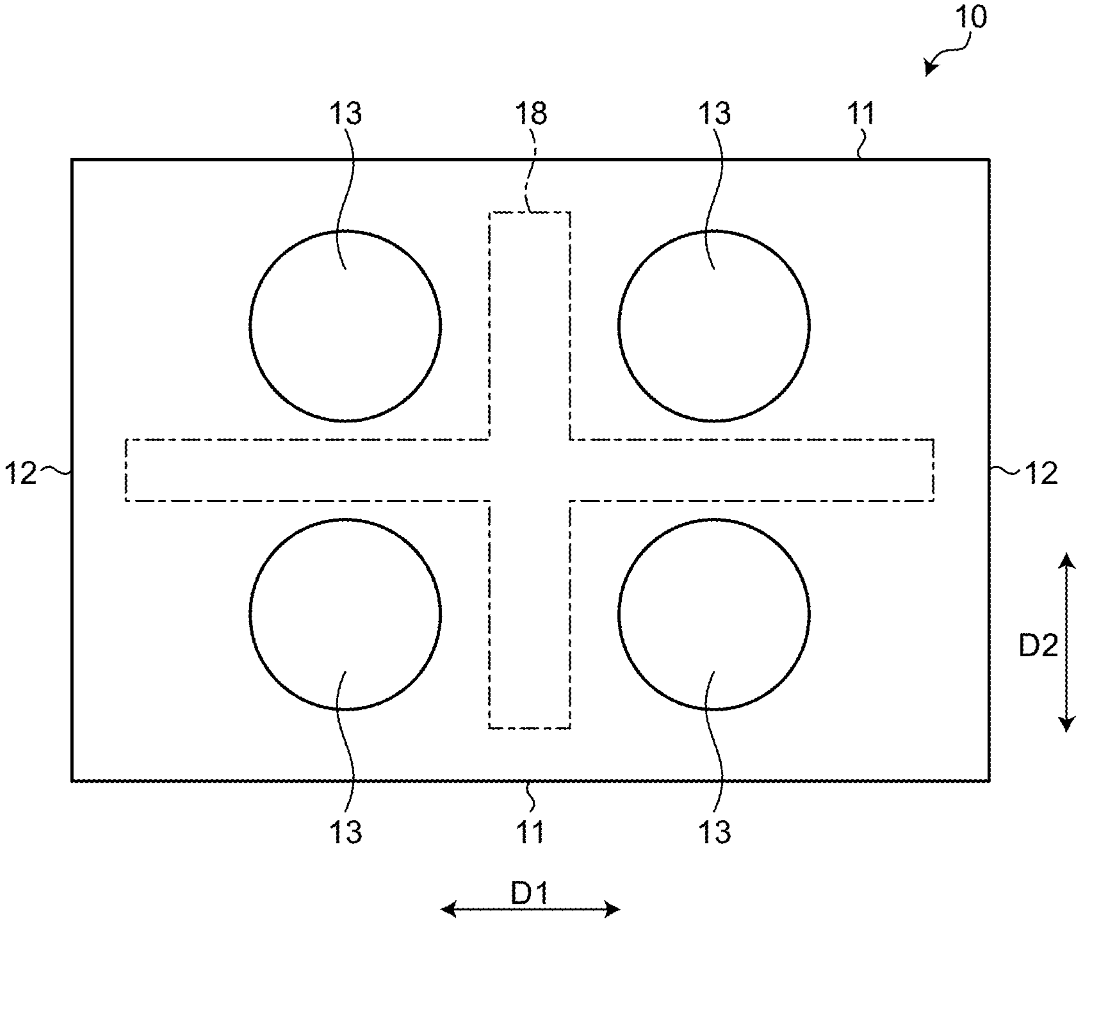
FIG. 14 is a plan view of the sheet material according to the embodiment.
Figure 15:
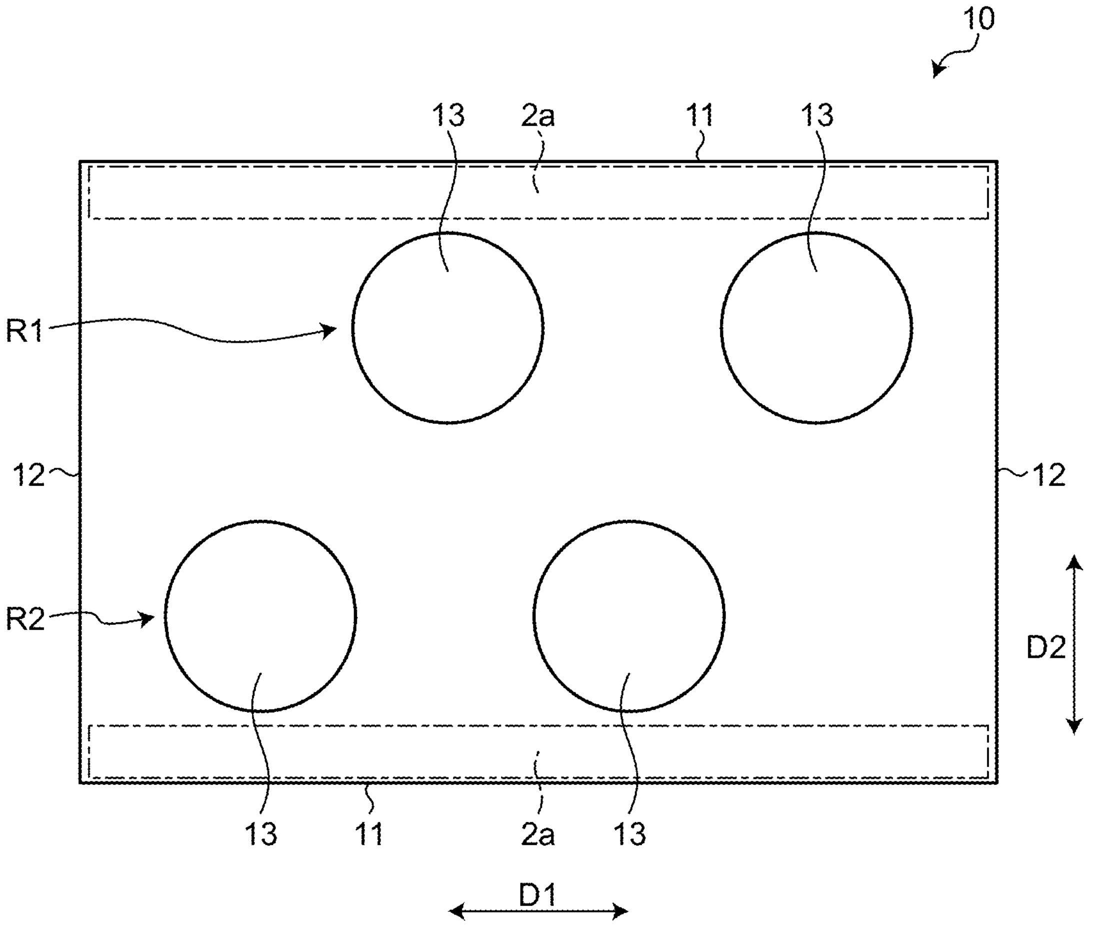
FIG. 15 is a plan view of the sheet material according to the embodiment.
Figure 16:
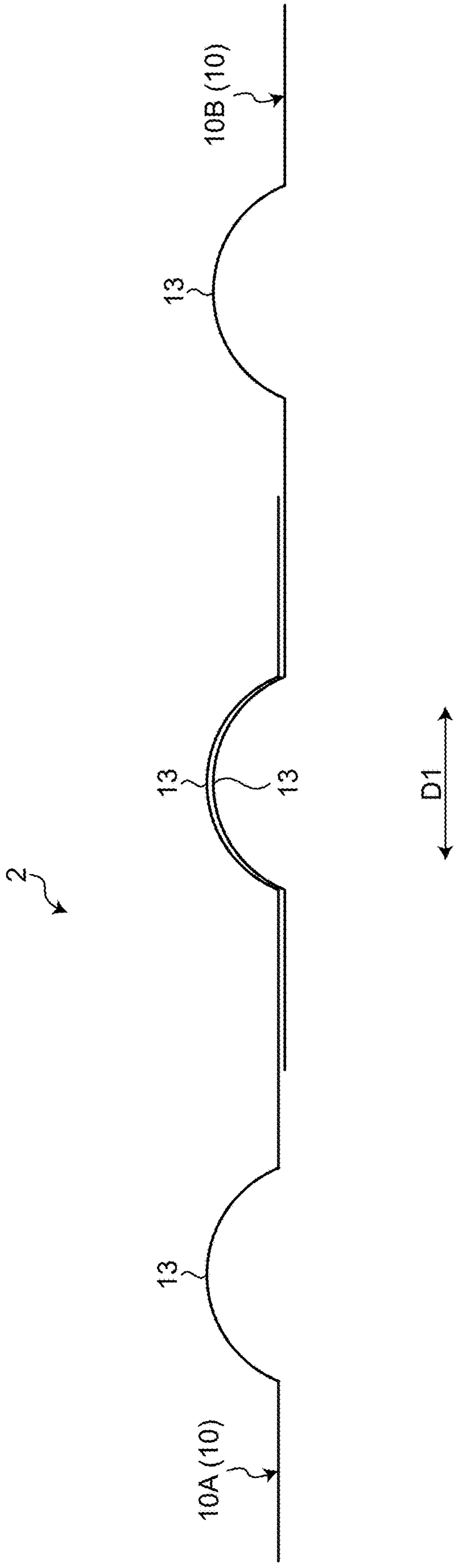
FIG. 16 is a diagram illustrating an example of how the sheet materials are overlapped.
Figure 17:
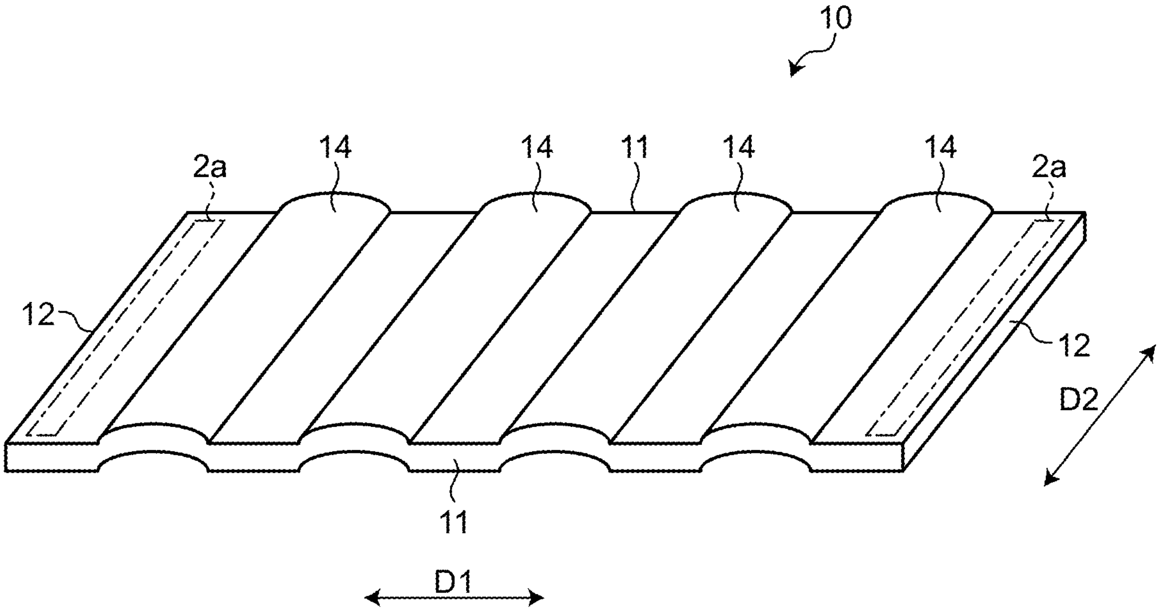
FIG. 17 is a perspective view of the sheet material according to the embodiment.
Figure 18:
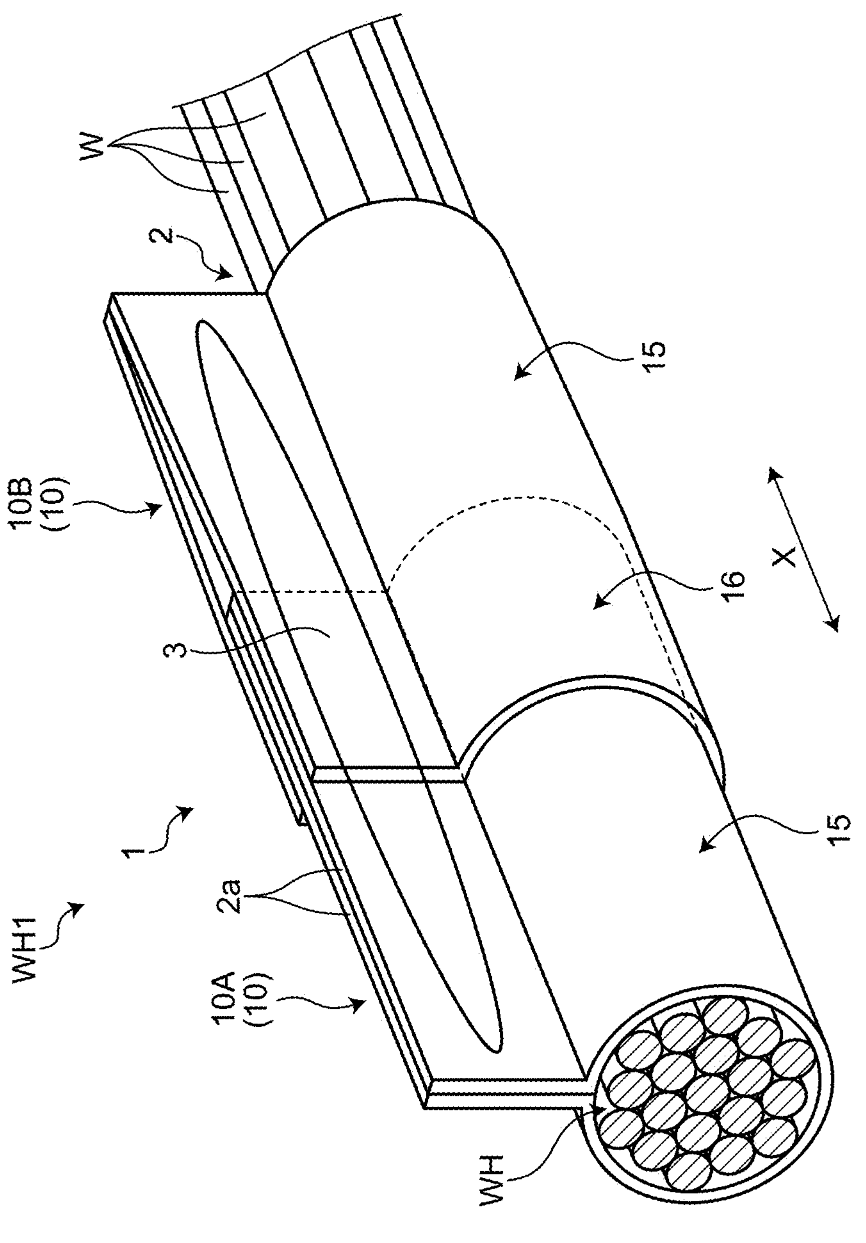
FIG. 18 is a perspective view of the protection member-equipped wire harness according to the embodiment.
Figure 19:
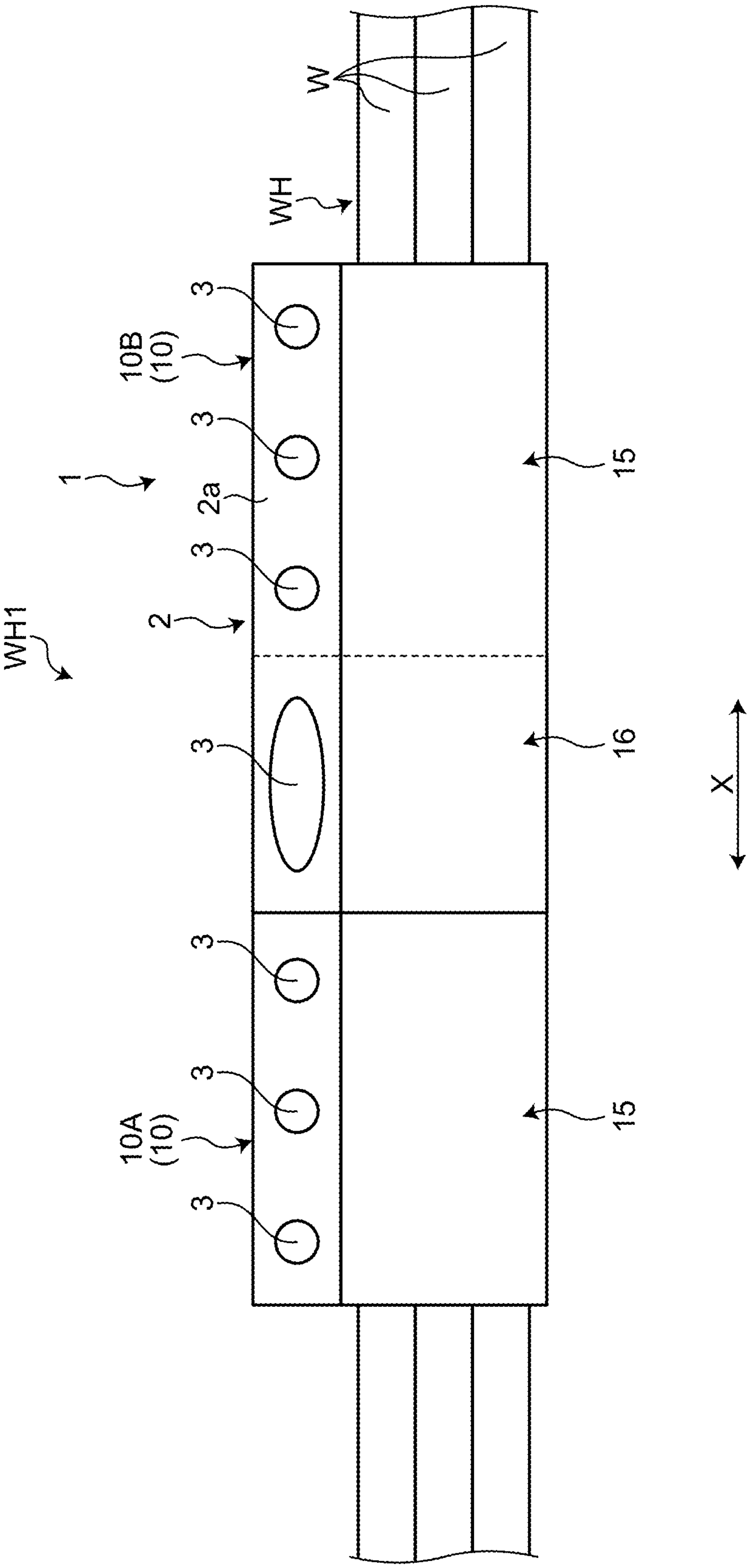
FIG. 19 is a front view of the protection member-equipped wire harness according to the embodiment.
Figure 20:
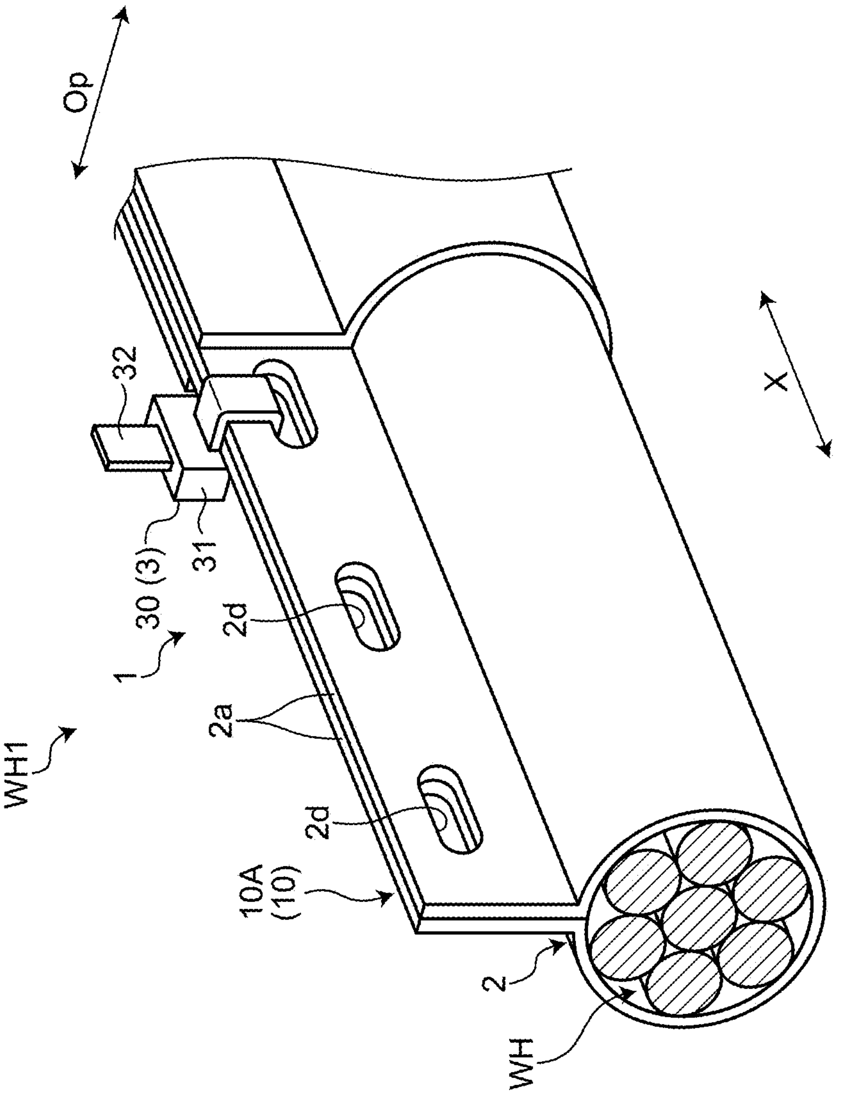
FIG. 20 is a perspective view of the protection member-equipped wire harness according to the embodiment.

FIG. 11 is a diagram for explaining a welding machine for forming a fixing portion, FIG. 12 is a perspective view of a sheet material according to the embodiment, FIG. 13 is a cross-sectional view of the sheet material according to the embodiment, FIGS. 14 and 15 are plan views of the sheet material according to the embodiment, FIG. 16 is a diagram illustrating an example of how the sheet materials are overlapped, FIG. 17 is a perspective view of the sheet material according to the embodiment, FIG. 18 is a perspective view of the protection member-equipped wire harness according to the embodiment, FIG. 19 is a front view of the protection member-equipped wire harness according to the embodiment, and FIG. 20 is a perspective view of the protection member-equipped wire harness according to the embodiment.

Figure 21:
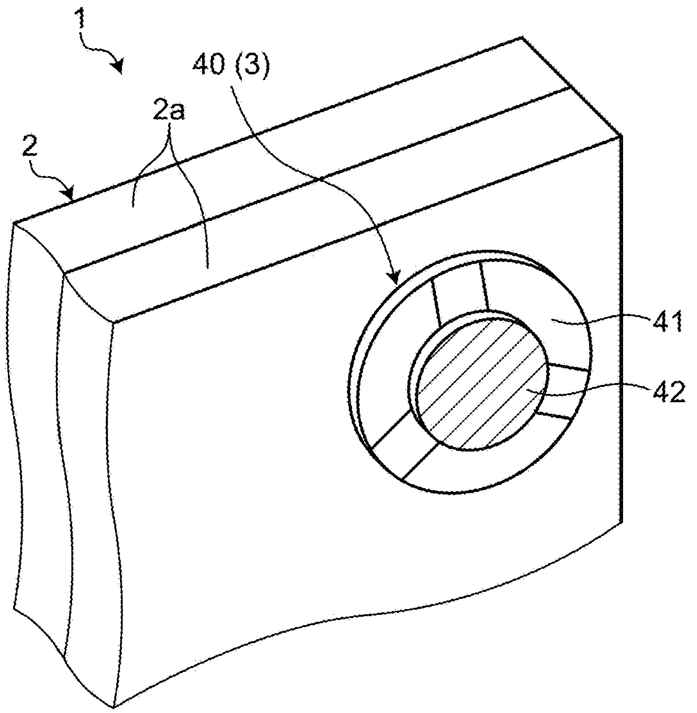
FIG. 21 is a perspective view of a wire harness protection member according to the embodiment.
Figure 22:
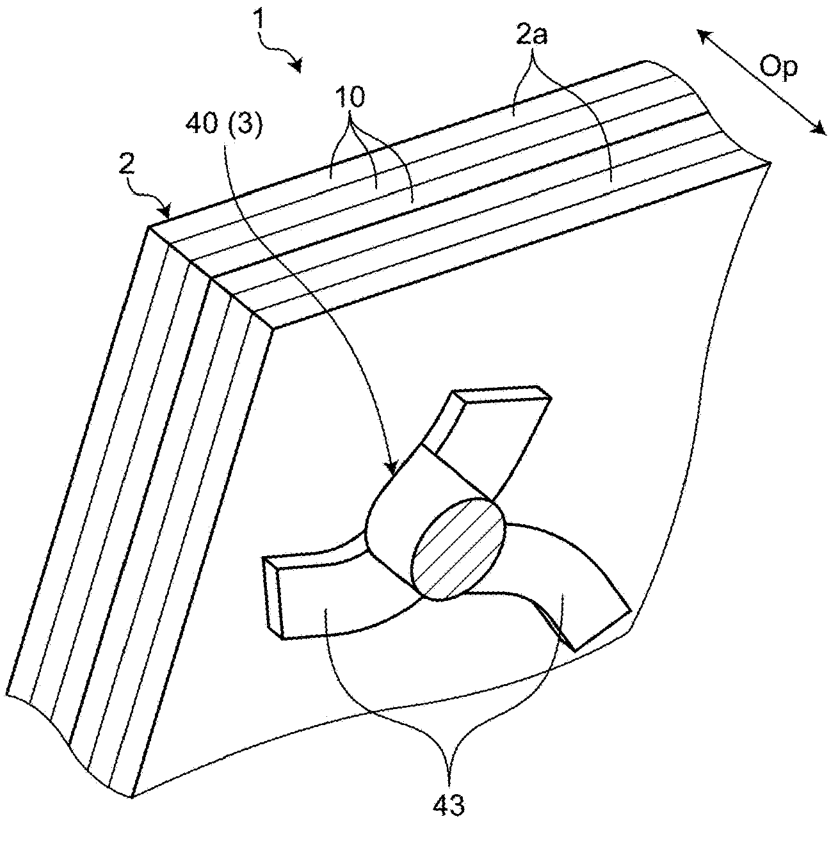
FIG. 22 is a perspective view of the wire harness protection member according to the embodiment.
Figure 23:
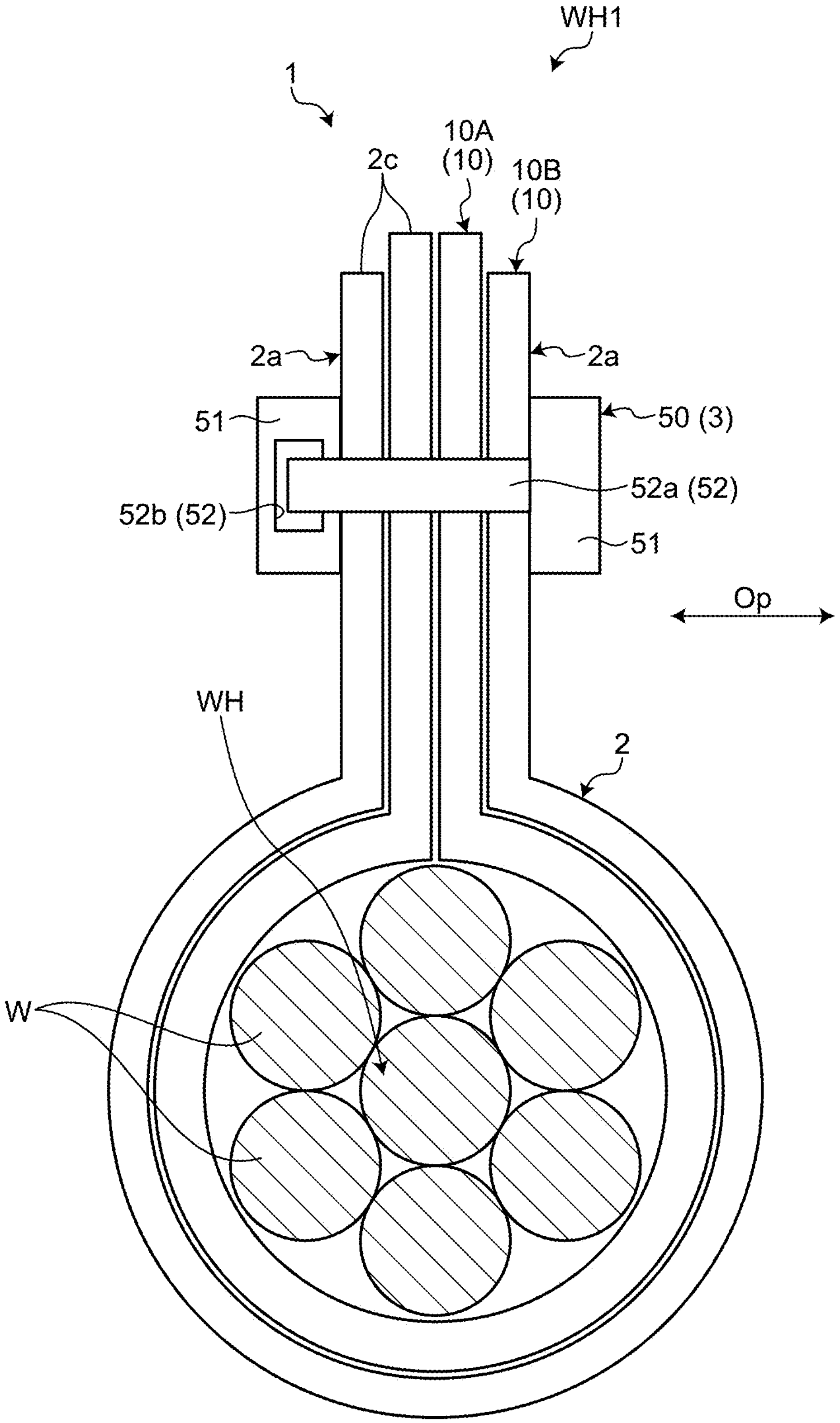
FIG. 23 is a side view of the protection member-equipped wire harness according to the embodiment.
Figure 24:
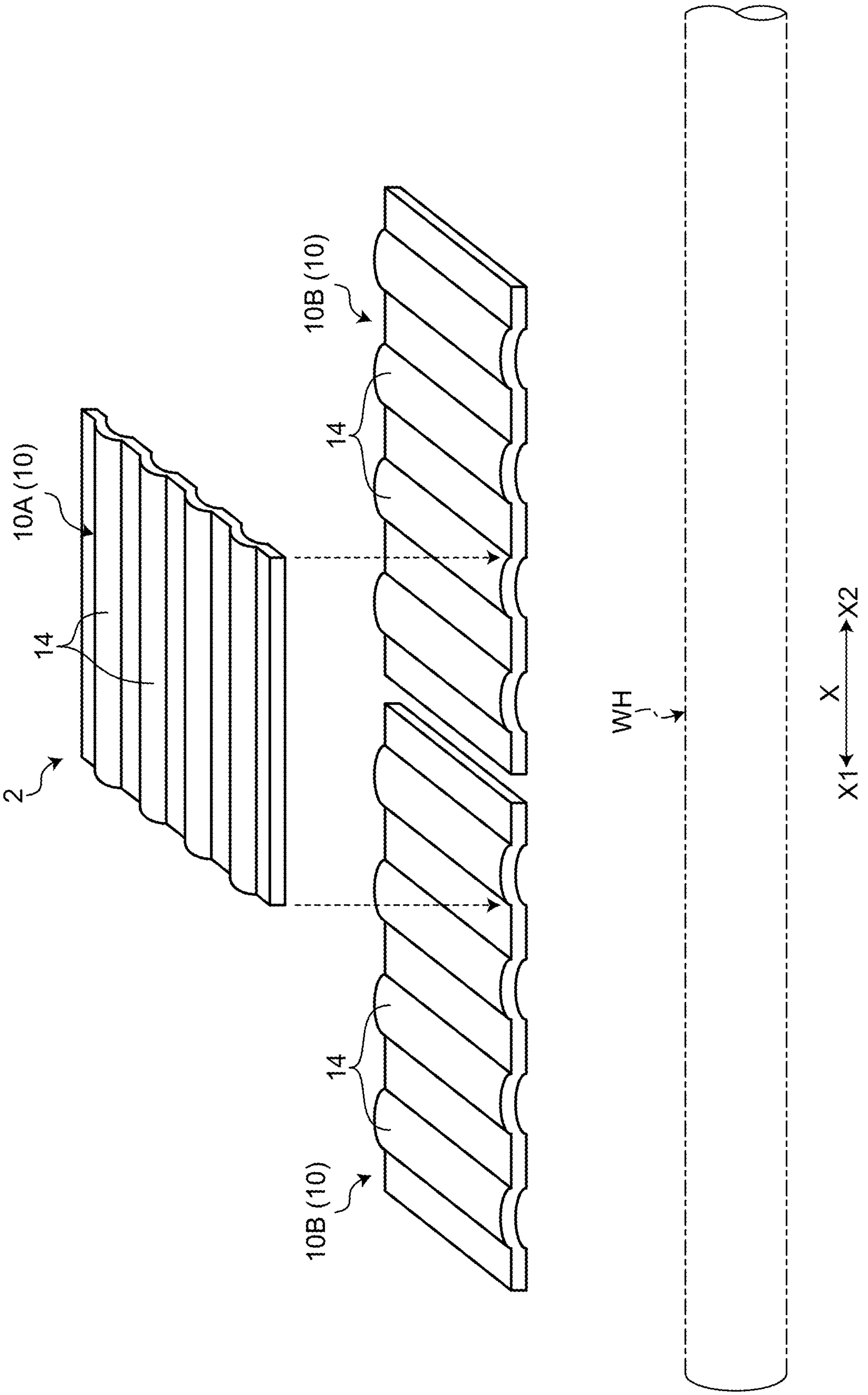
FIG. 24 is a diagram illustrating an example of how the sheet materials are overlapped.
Figure 25:
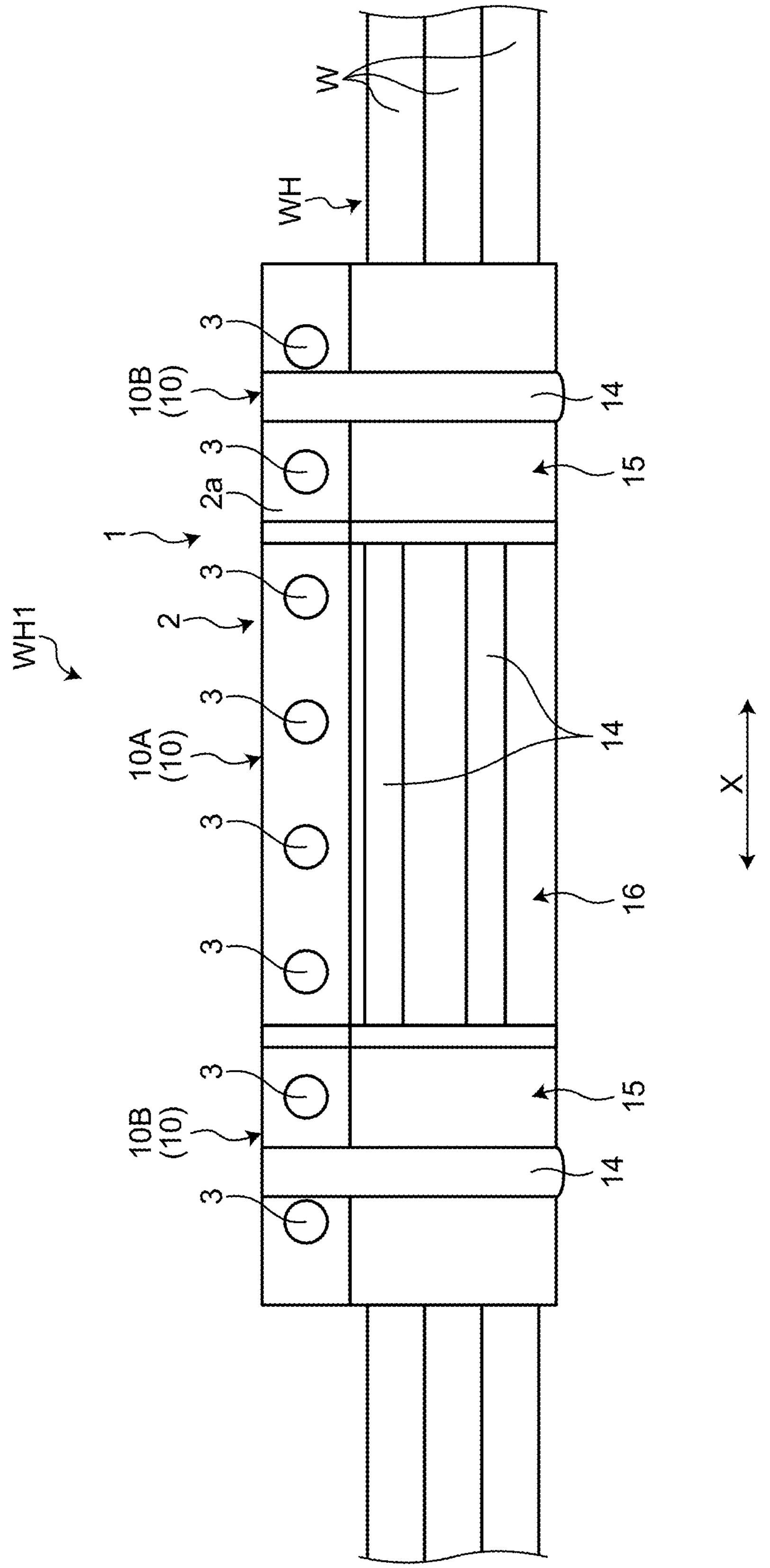
FIG. 25 is a front view of the protection member-equipped wire harness according to the embodiment.
Figure 26:
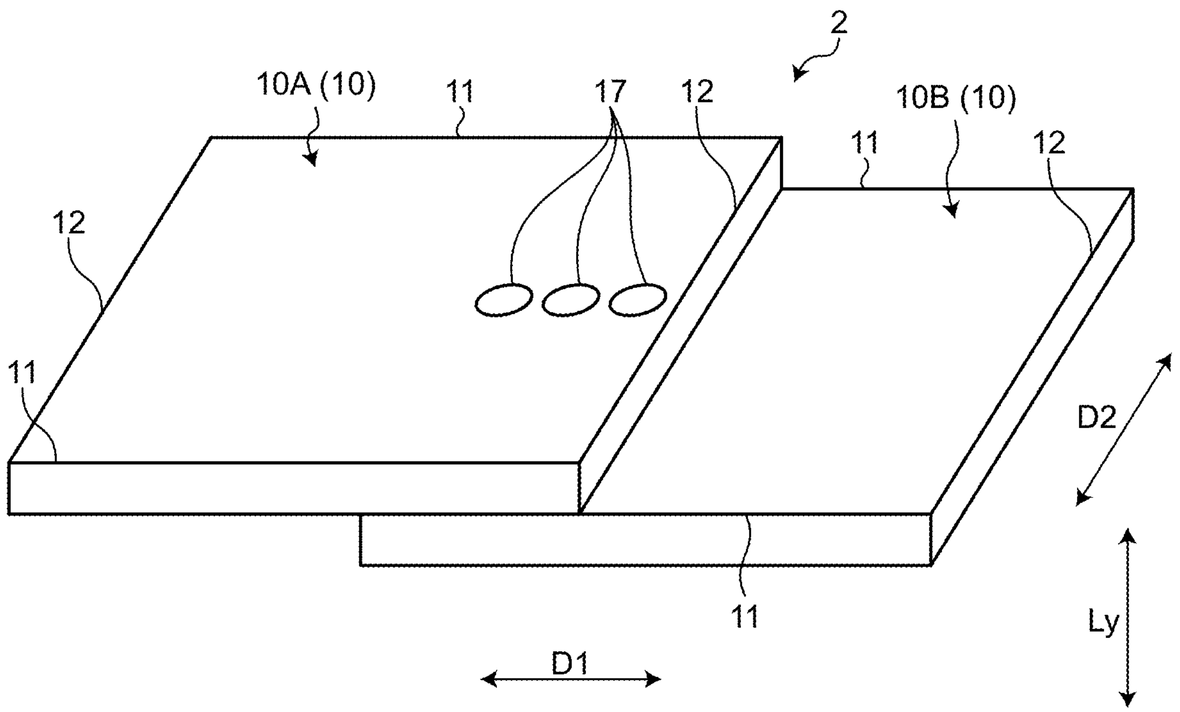
FIG. 26 is a perspective view of the protector according to the embodiment.
Figure 27:
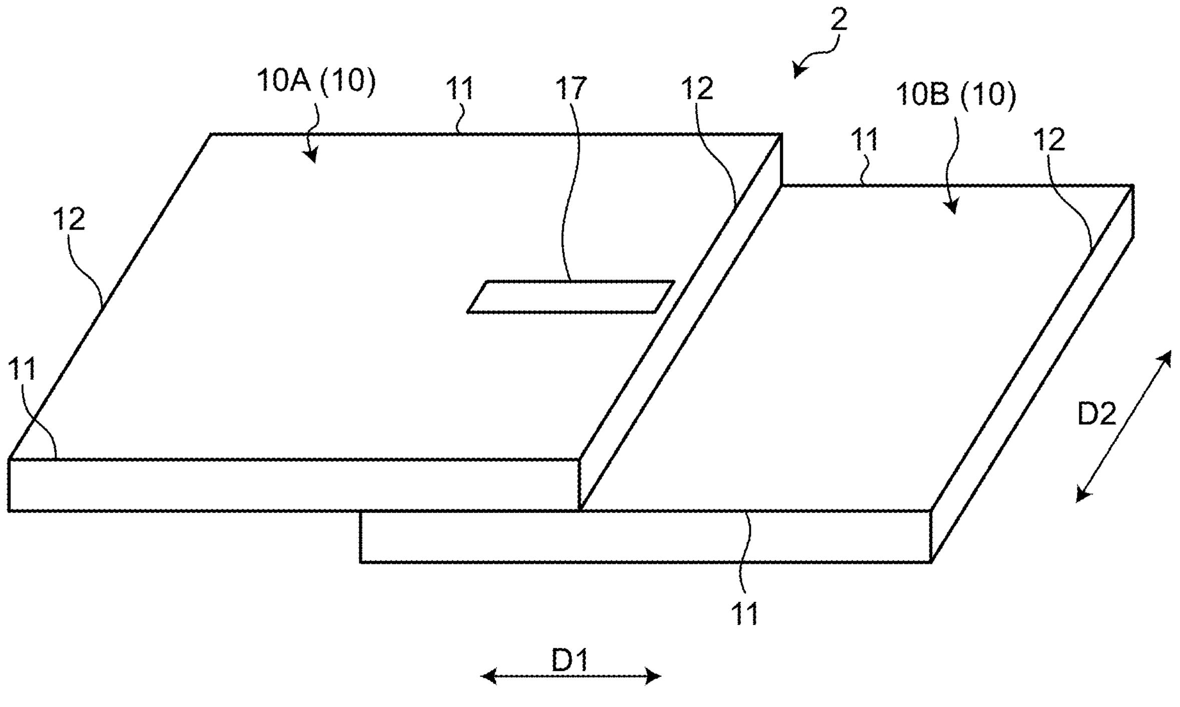
FIG. 27 is a perspective view of the protector according to the embodiment.
Figure 28:
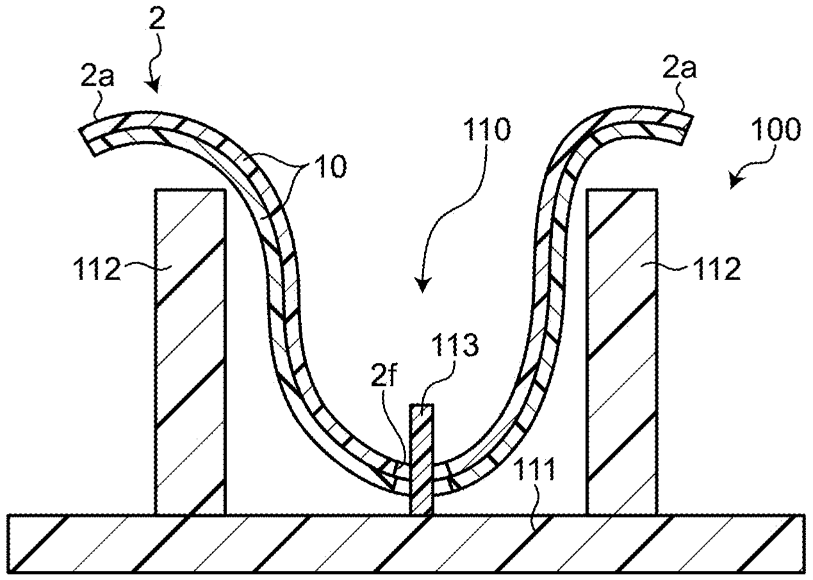
FIG. 28 is a cross-sectional view of the protector positioned by a positioning pin.

FIGS. 21 and 22 are perspective views of a wire harness protection member according to the embodiment, FIG. 23 is a side view of the protection member-equipped wire harness according to the embodiment, FIG. 24 is a diagram illustrating an example of how the sheet materials are overlapped, FIG. 25 is a front view of the protection member-equipped wire harness according to the embodiment, FIGS. 26 and 27 are perspective views of the protector according to the embodiment, and FIG. 28 is a cross-sectional view of the protector positioned by a positioning pin. FIG. 3 illustrates a cross section taken along line III-III of FIG. 1. FIG. 13 illustrates a cross section taken along line XIII-XIII of FIG. 12.

Figure 2:
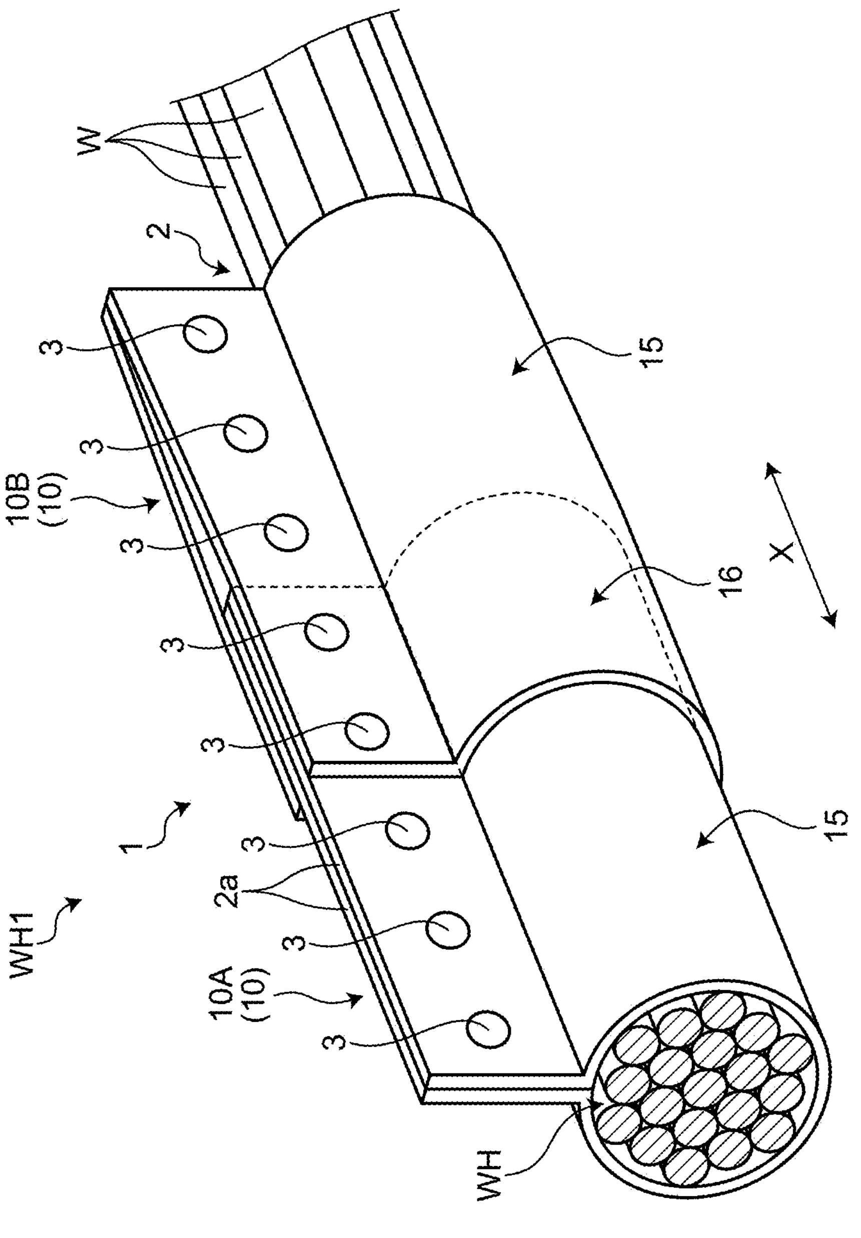
FIG. 2 is a perspective view of the protection member-equipped wire harness according to the embodiment.

As illustrated in FIGS. 1 and 2, a protection member-equipped wire harness WH1 of the present embodiment has a wire harness WH and a wire harness protection member 1. The wire harness WH has a plurality of electric wires W. The electric wire W is, for example, a coated electric wire. The wire harness protection member 1 is a member that is attached to the wire harness WH to protect the wire harness WH. The wire harness protection member 1 has a protector 2 and a fixing portion 3. The protector 2 is wound around the outside of the wire harness WH to protect the wire harness WH. The fixing portion 3 fixes two end portions 2*a* and 2*a* of the protector 2 to each other. As illustrated in FIG. 3, the protector 2 is constituted by overlapping a plurality of sheet materials 10. One of the sheet materials 10 overlaps at least a portion of another of the sheet materials 10. The fixing portion 3 fixes the two end portions 2*a* to each other along the opposing direction Op in which the end portions 2*a* of the sheet material 10 face each other. The fixing portion 3 is formed by, for example, welding. However, the fixing portion 3 may be a member attached to the protector 2, and may be, for example, a clip or a binding member.

In the wire harness protection member 1 of the present embodiment, a plurality of sheet materials 10 is used, and the plurality of sheet materials 10 is disposed so as to be shifted in the axial direction of the wire harness WH. In such a configuration, it is possible to realize the wire harness protection member 1 according to the required protection performance by combining the same sheet materials 10. Note that the protection performance of the wire harness protection member 1 is performance that includes rigidity, flexibility, impact resistance, size, and the like. In the wire harness protection member 1 of the present embodiment, since it is not necessary to keep a plurality of types of protection members having different protection performances in stock, the simplification of the stock management is realized.

As illustrated in FIG. 4, the sheet material 10 of the present embodiment has a rectangular shape. The sheet material 10 is molded of a flexible insulating synthetic resin. The material of the sheet material 10 is, for example, soft polyvinyl chloride (PVC). The exemplified sheet material 10 has a flat plate shape. The thickness t [mm] of the sheet material 10 is determined such that the sheet material 10 has appropriate flexibility and appropriate strength.

As illustrated in FIG. 5, the protector 2 is constituted by overlapping a plurality of sheet materials 10. The plurality of sheet materials 10 constituting the protector 2 has same materials and same shapes. In other words, the material and shape of one sheet material 10 constituting the protector 2 are the same as the material and shape of another sheet material 10 constituting the protector 2. All sheet materials 10 have the same dimensions. For example, when the shape of the sheet material 10 is rectangular, the lengths of corresponding sides 11 and 12 and the thicknesses t in the plurality of sheet materials 10 are the same.

As illustrated in FIG. 5, the plurality of sheet materials 10 overlaps each other such that one of the sheet materials 10 covers at least a portion of another of the sheet materials 10.

The exemplified rectangular sheet material 10 has a pair of first sides 11 and a pair of second sides 12. In the following description, a direction along the first side 11 is referred to as a first direction D1, and a direction along the second side 12 is referred to as a second direction D2. The first direction D1 and the second direction D2 are orthogonal to each other.

The plurality of sheet materials 10 constituting the protector 2 in FIG. 5 includes a first sheet material 10A and a second sheet material 10B. In the protector 2 illustrated in FIG. 5, the second sheet material 10B is overlapped with the first sheet material 10A by being shifted in the first direction D1. In other words, the second side 12 of the second sheet material 10B is shifted in the first direction D1 with respect to the second side 12 of the first sheet material 10A. Thus, the length L10 of the protector 2 in the first direction D1 is longer than the length L1 of the first side 11 of one sheet material 10. In other words, the protector 2 having a desired length L10 is realized by overlapping the plurality of sheet materials 10 in a shifted manner. The protector 2 may have three or more sheet materials 10. The number of sheet materials 10 constituting the protector 2 is determined according to the required protection performance and the like.

The work of attaching the protector 2 to the wire harness WH is performed by using, for example, a jig. FIG. 6 illustrates an example of a jig used for attaching the protector 2. The jig 100 in FIG. 6 is, for example, a jig plate. The jig 100 has a groove portion 110. The groove portion 110 may extend linearly or may have a curved portion. The shape of the groove portion 110 in plan view may be determined according to the shape of the routing path of the wire harness WH.

The groove portion 110 is constituted of a bottom wall 111 and a pair of side walls 112. The groove portion 110 has a width and a depth capable of accommodating the wire harness WH. The cross-sectional shape of the internal space of the exemplified groove portion 110 is substantially rectangular. The groove portion 110 has an opening 110*a* into which the protector 2 and the wire harness WH are inserted.

A method of manufacturing a protection member-equipped wire harness when the jig 100 is used will be described. The method of manufacturing a protection member-equipped wire harness includes a step of placing the protector 2, a step of accommodating the wire harness WH, and a step of fixing.

In the step of placing the protector 2, the protector 2 is placed in the groove portion 110 of the jig 100. As illustrated in FIG. 7, the protector 2 is inserted into the groove portion 110 from the opening 110*a* in a state where the plurality of sheet materials 10 is overlapped. At this time, the protector 2 is placed in the groove portion 110 such that the first direction D1 coincides with the extending direction of the groove portion 110. Therefore, the protector 2 is placed in the groove portion 110 in a state where the second sheet material 10B is shifted from the first sheet material 10A in the extending direction of the groove portion 110.

As illustrated in FIG. 8, the protector 2 is placed in the groove portion 110 while bending the central portion of the protector 2 into a substantially U-shape. The first side 11 of the protector 2 protrudes to the outside of the groove portion 110. In other words, the protector 2 is placed in the groove portion 110 such that the two end portions 2*a* protrude from the groove portion 110. The placed protector 2 has an opening 2*e* for receiving the wire harness WH. The jig 100 may have a holding structure that holds the two end portions 2*a* to form the opening 2*e*.

In the step of accommodating the wire harness WH, the wire harness WH is accommodated in the protector 2 placed in the groove portion 110. As illustrated in FIG. 9, the wire harness WH is inserted into the protector 2 from the opening 2*e*. The protector 2 accommodates the wire harness WH in a portion bent in a substantially U-shape.

FIG. 10 illustrates the protector 2 in which the wire harness WH is accommodated. The wire harness WH is placed on the protector 2 such that the wire harness WH penetrates a space portion surrounded by the protector 2. The protector 2 is wound around the wire harness WH so as to wrap the wire harness WH. The protector 2 wound around the wire harness WH has an inner side surface 2*b* facing the wire harness WH. The protector 2 is held by the groove portion 110 such that the inner side surfaces 2*b* of both end portions 2*a* of the protector 2 face each other. The jig 100 may have a support structure that supports the end portions 2*a* such that the inner side surfaces 2*b* face each other. The protector 2 is wound around the wire harness WH such that the openings of the plurality of sheet materials 10 face toward the same direction.

The step of fixing is a step of fixing both end portions 2*a* of the protector 2 to each other by the fixing portion 3. The fixing portion 3 is formed, for example, by welding two end portions 2*a*. The step of welding the end portion 2*a* is performed by, for example, a welding machine 200 as illustrated in FIG. 11. The means of welding by the welding machine 200 may be ultrasonic welding, may be thermal welding, may be laser welding, or may be any other means. For example, the welding machine 200 clamps the two end portions 2*a* and melts the sheet material 10 with heat generated by ultrasonic waves or the like to form the fixing portion 3.

As illustrated in FIG. 3, a portion of the sheet material 10 is melted to form the fixing portion 3. The protector 2 is wound around the wire harness WH such that the inner side surfaces 2*b* of both end portions 2*a* face each other to form mating surfaces extending in the axial direction X. In other words, the inner side surfaces 2*b* of the plurality of sheet materials 10 included in the protector 2 form mating surfaces extending in the axial direction X. In a state of being fixed by the fixing portion 3, the inner side surfaces 2*b* of the two end portions 2*a* face each other in the opposing direction Op.

The fixing portion 3 extends along the opposing direction Op from one end portion 2*a* to the other end portion 2*a*. In other words, the fixing portion 3 penetrates the two end portions 2*a* along the opposing direction Op. When the fixing portion 3 is formed, the opening between the two end portions 2*a* is closed. As illustrated in FIG. 3, the plurality of sheet materials 10 is fixed at same locations in the opening of the protector 2.

Note that, when the protector 2 is wound around the wire harness WH, the position of an end surface 2*c* of the sheet material 10 may be shifted. This shift occurs due to, for example, a difference between an inner circumference and an outer circumference of a portion wound around the wire harness WH. The end surface 2*c* of the sheet material 10 positioned at the relatively inner side protrudes with respect to the end surface 2*c* of the sheet material 10 positioned at the relatively outer side.

As illustrated in FIG. 2, the wire harness protection member 1 may have a plurality of fixing portions 3. The plurality of fixing portions 3 illustrated in FIG. 2 is disposed at intervals along the axial direction X of the wire harness WH. The plurality of fixing portions 3 may be disposed at equal intervals. In the portion between the two fixing portions 3, the two end portions 2*a* can slide or the two end portions 2*a* can be separated. In addition, when the plurality of sheet materials 10 overlaps each other in the section between the two fixing portions 3, the plurality of sheet materials 10 can slide or the plurality of sheet materials 10 can be separated. Therefore, the wire harness protection member 1 having the plurality of fixing portions 3 can be flexibly bent. In other words, the wire harness protection member 1 having the plurality of fixing portions 3 has high followability with respect to the wire harness WH routed while being bent.

Both end portions 2*a* are fixed to each other by the fixing portion 3, so that the wire harness protection member 1 is attached to the wire harness WH. Thus, the protection member-equipped wire harness WH1 is manufactured.

As illustrated in FIG. 1 and FIG. 2, the wire harness protection member 1 of the present embodiment has a relatively low-rigidity portion 15 and a relatively high-rigidity portion 16. The high-rigidity portion 16 is constituted by a relatively larger number of sheet materials 10 than the low-rigidity portion 15. For example, in the wire harness protection member 1 illustrated in FIGS. 1 and 2, the high-rigidity portion 16 is constituted by overlapping the first sheet material 10A and the second sheet material 10B. In the high-rigidity portion 16, the plurality of sheet materials 10 is fixed to each other by the fixing portion 3.

The low-rigidity portion 15 is constituted by a relatively small number of sheet materials 10. For example, in the wire harness protection member 1 in FIGS. 1 and 2, the low-rigidity portion 15 is constituted by one first sheet material 10A, or is constituted by one second sheet material 10B. Since the low-rigidity portion 15 is constituted by a small number of sheet materials 10, the rigidity thereof is lower than that of the high-rigidity portion 16. In other words, the low-rigidity portion 15 has higher bendability with respect to the high-rigidity portion 16.

The high-rigidity portion 16 is provided by corresponding to, for example, a portion of the wire harness WH that is linearly routed. The low-rigidity portion 15 is provided by corresponding to, for example, a portion of the wire harness WH that is bent and routed. The high-rigidity portion 16 may be provided in a portion where high protection performance is required.

Note that the sheet material 10 may have a concave portion or a convex portion. FIGS. 12 and 13 illustrate a sheet material 10 having a curved portion 13 that is curved in a spherical shape. The sheet material 10 in FIG. 12 has a plurality of curved portions 13. As illustrated in FIG. 13, the curved portion 13 is curved toward one side in the thickness direction Z of the sheet material 10. One surface of the curved portion 13 is a convex surface, and the other surface of the curved portion 13 is a concave surface.

The rigidity and bendability of the sheet material 10 can be adjusted by the arrangement of the curved portion 13. In the sheet material 10 illustrated in FIG. 14, the plurality of curved portions 13 is disposed in a grid pattern. In other words, the plurality of curved portions 13 is arranged along the first direction D1 and the second direction D2. In a case where the plurality of curved portions 13 is disposed in a grid pattern, a region 18 having high bendability is formed between adjacent curved portions 13. Such a sheet material 10 has high bendability in a state of being wound around the wire harness WH.

In the sheet material 10 illustrated in FIG. 15, the plurality of curved portions 13 is alternately disposed in a staggered manner. The plurality of curved portions 13 has a first row R1 and a second row R2. The first row R1 and the second row R2 have a plurality of curved portions 13 arranged in the first direction D1. The first row R1 and the second row R2 are disposed by being shifted in the first direction D1. For example, in the first direction D1, the curved portion 13 of the second row R2 is disposed between two curved portions 13 of the first row R1.

The sheet material 10 in FIG. 15 is wound around the wire harness WH with the portion along the first side 11 as the end portion 2*a*, for example. The sheet material 10 in which the plurality of curved portions 13 is alternately disposed has high rigidity in a state of being wound around the wire harness WH. Such a sheet material 10 can improve the rigidity of the wire harness protection member 1 against bending. Note that the sheet material 10 may have other rows in addition to the first row R1 and the second row R2. In other words, the sheet material 10 may have the curved portions 13 arranged in three or more rows.

The sheet materials 10 having the curved portions 13 may be overlapped such that the curved portions 13 are fitted to each other. As illustrated in FIG. 16, a plurality of sheet materials 10 may be overlapped such that the curved portion 13 of one sheet material 10 enters the curved portion 13 of another sheet material 10. Unlike this, the plurality of sheet materials 10 may be overlapped such that the positions of the curved portions 13 are shifted. In this case, a gap is formed between the two sheet materials 10, and the rigidity and impact resistance of the wire harness protection member 1 are improved.

The protector 2 may be wound around the wire harness WH with the convex surface of the curved portion 13 facing outward. In this case, the contact between the peripheral components and the wire harness protection member 1 is a point contact, and the wear resistance of the wire harness protection member 1 is improved. In addition, since the contact area with the peripheral components is small, the occurrence of abnormal noise is suppressed.

The shape of the curved portion provided in the sheet material 10 is not limited to a spherical shape. FIG. 17 illustrates a sheet material 10 having a groove-shaped curved portion 14. The sheet material 10 has a plurality of curved portions 14. The curved portion 14 extends linearly and has an arc-shaped cross-sectional shape. The curved portion 14 in FIG. 17 extends in the second direction D2. A predetermined interval is provided between two adjacent curved portions 14. The plurality of curved portions 14 is disposed, for example, at equal intervals along the first direction D1.

The sheet material 10 is wound around the wire harness WH with a portion along the second side 12 as an end portion 2*a*, for example. In this case, the sheet material 10 can improve the rigidity of the wire harness protection member 1 against bending. Unlike this, the sheet material 10 may be wound around the wire harness WH with the portion along the first side 11 as the end portion 2*a*. In this case, the sheet material 10 can be flexibly bent by following the wire harness WH.

The sheet materials 10 having the curved portions 14 are overlapped such that the curved portions 14 are fitted to each other, for example. In other words, in the protector 2, a plurality of sheet materials 10 may be overlapped such that the curved portion 14 of one sheet material 10 enters the curved portion 14 of another sheet material 10. Unlike this, the plurality of sheet materials 10 may be overlapped such that the positions of the curved portions 14 are shifted. Note that the plurality of sheet materials 10 may be overlapped such that the curved portions 14 protrude in opposite directions. For example, the plurality of sheet materials 10 may be overlapped such that the convex surfaces of the curved portions 14 are in contact with each other, or may be overlapped such that the concave surfaces of the curved portions 14 face each other.

The wire harness protection member 1 may have a linearly provided fixing portion 3. FIG. 18 illustrates a wire harness protection member 1 having a linear fixing portion 3. The fixing portion 3 extends linearly along the axial direction X. The fixing portion 3 is provided, for example, from one end to the other end of the end portion 2*a* in the axial direction X. The linear fixing portion 3 can improve the rigidity of the end portion 2*a* and improve the straightness of the wire harness WH.

Note that the aspect of the fixing portion 3 provided in the high-rigidity portion 16 and the aspect of the fixing portion 3 provided in the low-rigidity portion 15 may be different from each other. The aspect of the fixing portion 3 includes at least one of the shape of the fixing portion 3, the arrangement of the fixing portion 3, or the number of the fixing portions 3 per unit length. For example, as illustrated in FIG. 19, a linear fixing portion 3 may be provided in the high-rigidity portion 16, and a plurality of fixing portions 3 disposed at intervals may be provided in the low-rigidity portion 15.

In the high-rigidity portion 16, the two end portions 2*a* are fixed to each other by one fixing portion 3 extending linearly. The shape of the fixing portion 3 provided in the high-rigidity portion 16 may be an oblong shape, may be a rectangular shape, or may be any other shape. In the low-rigidity portion 15, the two end portions 2*a* are fixed to each other by a plurality of fixing portions 3 disposed at intervals. The shape of the fixing portion 3 provided in the low-rigidity portion 15 may be a point-like shape, may be a circular shape, or may be any other shape.

A binding member 30 illustrated in FIG. 20 may be used as the fixing portion 3. The binding member 30 is, for example, a member called a binding band, and has a head portion 31 and a band portion 32. The band portion 32 is inserted through a through-hole 2*d* provided in an end portion 2*a* of the protector 2 and is engaged with the head portion 31. The binding member 30 fixes the two end portions 2*a* to each other along the opposing direction Op. The through-hole 2*d* is formed in each sheet material 10 constituting the protector 2. The plurality of sheet materials 10 is overlapped such that the through-holes 2*d* face each other. The exemplified protector 2 has a plurality of through-holes 2*d*. The plurality of through-holes 2*d* is disposed at intervals along the axial direction X.

A clip 40 illustrated in FIGS. 21 and 22 may be used as the fixing portion 3. The clip 40 is a fastening member called a two-piece clip or a push rivet. The clip 40 illustrated in FIGS. 21 and 22 has a head portion 41, a pin 42, and a plurality of leg portions 43. The pin 42 penetrates through the head portion 41. The pin 42 and the leg portion 43 are inserted through the through-hole of the protector 2. The clip 40 is configured such that the leg portion 43 is expanded by pushing the pin 42. The clip 40 clamps the sheet material 10 between the expanded leg portion 43 and the head portion 41, and fastens the two end portions 2*a* of the protector 2. The clip 40 fixes the two end portions 2*a* to each other along the opposing direction Op.

Note that, in the case of forming the linear fixing portion 3 as in FIG. 18, for example, a linear clip such as a clip called a food clip or a sealing clip may be used. FIG. 23 illustrates a side view of the protector 2 fastened by a linear clip 50. The clip 50 has two holders 51 and an engaging structure 52. The clip 50 is molded of, for example, an insulating synthetic resin.

The holder 51 clamps and holds the two end portions 2*a* of the protector 2. The two holders 51 are formed in a plate shape or a rod shape, and face each other in the opposing direction Op with the two end portions 2*a* interposed therebetween. The engaging structure 52 engages the two holders 51. The engaging structure 52 is constituted by, for example, an engaging arm 52*a* included in one of the holders 51 and a locking portion 52*b* included in another of the holders 51. In this case, the locking portion 52*b* locks the engaging arm 52*a* in the opposing direction Op. The engaging structures 52 are disposed at both ends in the axial direction X with respect to the holder 51. The clip 50 can fix the two end portions 2*a* to each other along the opposing direction Op. Note that, in addition to both ends of the holder 51, a further engaging structure may be provided at the intermediate portion of the holder 51.

The plurality of sheet materials 10 having the curved portions 14 may be overlapped such that the extending directions of the curved portions 14 are different from each other. FIG. 24 illustrates the protector 2 in which the sheet materials 10 are overlapped such that the extending directions of the curved portions 14 are different from each other. The protector 2 in FIG. 24 has one first sheet material 10A and two second sheet materials 10B.

Each of the two second sheet materials 10B is overlapped with the first sheet material 10A by being shifted in the axial direction X with respect to the first sheet material 10A. One of the second sheet materials 10B is shifted to a first side X1 in the axial direction X with respect to the first sheet material 10A. Another of the second sheet materials 10B is shifted to a second side X2 in the axial direction X with respect to the first sheet material 10A.

The curved portion 14 of the first sheet material 10A extends in the axial direction X. The curved portion 14 of the second sheet material 10B extends in a direction orthogonal to the curved portion 14 of the first sheet material 10A. The first sheet material 10A is overlapped on a portion of the second sheet material 10B. The protector 2 constituted of the three sheet materials 10 is attached to the wire harness WH by using, for example, the jig 100 and the welding machine 200.

FIG. 25 illustrates the protection member-equipped wire harness WH1, which is constituted of the wire harness WH, and the protector 2 in FIG. 24. As illustrated in FIG. 25, the wire harness protection member 1 has a low-rigidity portion 15 and a high-rigidity portion 16. The high-rigidity portion 16 is constituted by overlapping the first sheet material 10A and the second sheet material 10B. The low-rigidity portion 15 is constituted by the second sheet material 10B.

In the first sheet material 10A, the curved portion 14 extends in the axial direction X. On the other hand, in the second sheet material 10B, the curved portion 14 extends in the circumferential direction so as to surround the wire harness WH. Therefore, the rigidity of the first sheet material 10A against bending is higher than that of the second sheet material 10B. In other words, the high-rigidity portion 16 has a higher rigidity than the low-rigidity portion 15 in that the high-rigidity portion has at least the first sheet material 10A.

In the high-rigidity portion 16, the first sheet material 10A and the second sheet material 10B overlap each other. In other words, the high-rigidity portion 16 has a higher rigidity than the low-rigidity portion 15 in that a relatively large number of the sheet materials 10 is overlapped. Therefore, in the high-rigidity portion 16, the rigidity is improved by both the extending direction of the curved portion 14 and the number of the sheet materials 10.

In the protector 2 when attached to the wire harness WH, a means of suppressing the positional shift of the plurality of sheet materials 10 may be used. For example, as illustrated in FIG. 26, a welding portion 17 which welds the plurality of sheet materials 10 may be formed. The protector 2 in FIG. 26 has a plurality of welding portions 17. The welding portion 17 is formed so as to penetrate the protector 2 along the laminating direction Ly in which the sheet materials 10 overlap each other. The welding portion 17 is disposed in a region where the plurality of sheet materials 10 overlaps each other.

The plurality of welding portions 17 is disposed along the axial direction X of the wire harness WH when wound around the wire harness WH. In the protector 2 in FIG. 26, the plurality of welding portions 17 is arranged in the first direction D1. In this case, the protector 2 is wound around the wire harness WH such that the wire harness WH extends in the first direction D1. The welding portion 17 is disposed, for example, at a central portion of the protector 2 in the second direction D2.

As illustrated in FIG. 27, the welding portion 17 may be formed linearly. The welding portion 17 in FIG. 27 extends along the axial direction X of the wire harness WH when wound around the wire harness WH. The linear welding portion 17 can improve the straightness of the wire harness protection member 1.

The means of suppressing the positional shift of the sheet material 10 may be a positioning pin provided in the jig 100. FIG. 28 illustrates the jig 100 having a positioning pin 113. The positioning pin 113 is disposed on the bottom wall 111, for example. The exemplified positioning pin 113 protrudes from the bottom wall 111 toward the opening of the groove portion 110. The protector 2 has a through-hole 2*f* into which the positioning pin 113 is inserted. The through-hole 2*f* is disposed in a portion where the plurality of sheet materials 10 overlaps each other. The through-hole 2*f* is provided in each sheet material 10. In other words, the plurality of sheet materials 10 is overlapped such that the through-holes 2*f* face each other. The positioning pin 113 is inserted into the through-hole 2*f* of each sheet material 10, and suppresses the positional shift of the plurality of sheet materials 10.

According to the method of manufacturing the protection member-equipped wire harness WH1 according to the present embodiment, a complicated work such as spirally winding a tape around the wire harness WH is not required. Therefore, the efficiency of the work of manufacturing the protection member-equipped wire harness WH1 is improved.

Further, in the method of manufacturing the protection member-equipped wire harness WH1 according to the present embodiment, the work of attaching a plurality of wire harness protection members 1 to the wire harness WH can be performed in parallel or simultaneously. In this case, in the step of placing the protector 2, a plurality of protectors 2 may be placed for one groove portion 110. The plurality of protectors 2 is placed, for example, at different positions along the axial direction X of the wire harness WH. A plurality of welding machines 200 may be disposed for one groove portion 110 in accordance with the number of protectors 2 to be placed. Alternatively, one welding machine 200 may perform welding on a plurality of protectors 2.

The jig 100 may have a plurality of groove portions 110 corresponding to the plurality of protectors 2 and a plurality of welding machines 200 corresponding to the respective groove portions 110.

As described above, the wire harness protection member 1 of the present embodiment has the protector 2 and the fixing portion 3. The protector 2 is constituted by overlapping the plurality of sheet materials 10. The fixing portion 3 fixes both end portions 2*a* of the protector 2 to each other in a state where the protector 2 is wound around the wire harness WH. The plurality of sheet materials 10 has same materials and same shapes. The plurality of sheet materials 10 includes a first sheet material 10A and a second sheet material 10B. The second sheet material 10B is disposed at a position shifted from the first sheet material 10A in the axial direction X of the wire harness WH, and partially overlaps the first sheet material 10A.

The protector 2 has an inner side surface 2*b* facing the wire harness WH in a state of being wound around the wire harness WH. The protector 2 is wound around the wire harness WH such that the inner side surfaces 2*b* of both end portions 2*a* of the protector 2 face each other and form mating surfaces extending in the axial direction X. The fixing portion 3 fixes both end portions 2*a* of the protector 2 to each other along the opposing direction Op in which the inner side surfaces 2*b* of both end portions 2*a* of the protector 2 face each other. In the wire harness protection member 1 according to the present embodiment, protection members having different required protection performances can be manufactured from the same sheet material 10. Therefore, according to the wire harness protection member 1 of the present embodiment, it is possible to reduce the number of types of components required for protection members having different protection performances.

The fixing portion 3 may be formed by welding the sheet materials 10 which are at both end portions 2*a* of the protector 2. In this case, it is possible to automate the process of forming the fixing portion 3 and improve the efficiency. In the low-rigidity portion 15, the fixing portion 3 may be formed by welding both end portions 2*a* of one sheet material 10. In the high-rigidity portion 16, the fixing portion 3 may be formed by welding both end portions 2*a* of the plurality of sheet materials 10.

In the wire harness protection member 1, the plurality of fixing portions 3 may be disposed at intervals along the axial direction X of the wire harness WH. In this case, the wire harness protection member 1 can be flexibly bent.

The method of manufacturing the protection member-equipped wire harness according to the present embodiment includes the step of placing the protector 2, the step of accommodating the wire harness WH, and the step of fixing. In the step of placing the protector 2, the protector 2 constituted by overlapping the plurality of sheet materials 10 is placed in the groove portion 110 of the jig 100. In the step of accommodating the wire harness WH, the wire harness WH is accommodated in the protector 2 placed in the groove portion 110. In the step of fixing, both end portions 2*a* of the protector 2 are fixed to each other by the fixing portion 3, and the protector 2 is attached to the wire harness WH. According to the method for manufacturing the protection member-equipped wire harness according to the present embodiment, the step of attaching the protection member to the wire harness WH is performed efficiently.

The contents disclosed in the above embodiments can be performed in combination as appropriate.

In the wire harness protection member according to the present embodiment, the plurality of sheet materials includes a first sheet material and a second sheet material, the second sheet material is disposed at a position shifted from the first sheet material in an axial direction of the wire harness and partially overlaps the first sheet material, and the fixing portion fixes both end portions of the protector to each other along an opposing direction in which the inner side surfaces of both end portions of the protector face each other. The wire harness protection member according to the present embodiment has an effect of capable of realizing the required protection performance while suppressing an increase in the number of types of members.

The method of manufacturing a protection member-equipped wire harness according to the present embodiment has an effect of enabling to efficiently perform the step of attaching the protection member to the wire harness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness protection member comprising:

a protector constituted by overlapping a plurality of sheet materials; and a fixing portion which fixes both end portions of the protector to each other in a state where the protector is wound around a wire harness, wherein the plurality of sheet materials has same materials and same shapes, the plurality of sheet materials includes a first sheet material and a second sheet material, the second sheet material is disposed at a position shifted from the first sheet material in an axial direction of the wire harness, and partially overlaps the first sheet material, the protector has an inner side surface facing the wire harness in a state of being wound around the wire harness, the protector is wound around the wire harness such that the inner side surfaces of both end portions of the protector face each other to form mating surfaces extending in the axial direction, and the fixing portion fixes both end portions of the protector to each other along an opposing direction in which the inner side surfaces of both end portions of the protector face each other.

2. The wire harness protection member according to claim 1, wherein the fixing portion is formed by welding the sheet materials which are at both end portions of the protector.

3. The wire harness protection member according to claim 1, wherein a plurality of the fixing portions is disposed at intervals along an axial direction of the wire harness.

4. The wire harness protection member according to claim 2, wherein a plurality of the fixing portions is disposed at intervals along an axial direction of the wire harness.

5. A method of manufacturing a protection member-equipped wire harness, the method comprising:

a step of placing a protector constituted by overlapping a plurality of sheet materials in a groove portion of a jig;

a step of accommodating a wire harness in the protector placed in the groove portion; and a step of fixing both end portions of the protector to each other by a fixing portion to attach the protector to the wire harness.

* * * * *